US012695544B2

(12) United States Patent
Huang

(10) Patent No.: US 12,695,544 B2
(45) Date of Patent: Jul. 28, 2026

(54) CODING METHOD AND APPARATUS AND READABLE STORAGE MEDIUM

(71) Applicant: VIVO MOBILE COMMUNICATION CO., LTD., Guangdong (CN)

(72) Inventor: Wei Huang, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 152 days.

(21) Appl. No.: 18/775,121

(22) Filed: Jul. 17, 2024

(65) Prior Publication Data

US 2024/0372650 A1     Nov. 7, 2024

Related U.S. Application Data

(63) Continuation of application No. PCT/CN2023/071802, filed on Jan. 11, 2023.

(30) Foreign Application Priority Data

Jan. 18, 2022    (CN) .......................... 202210056640.9

(51) Int. Cl.
  *H04L 1/06*       (2006.01)
  *H04B 7/02*       (2018.01)
       (Continued)

(52) U.S. Cl.
  CPC ......... *H04L 1/0643* (2013.01); *H04B 7/0669* (2013.01); *H04L 1/0612* (2013.01);
       (Continued)

(58) Field of Classification Search
  CPC ... H04L 1/0643; H04L 1/0612; H04L 1/0625; H04L 1/0662; H04L 1/0668;
       (Continued)

(56) References Cited

U.S. PATENT DOCUMENTS 7,773,699 B2      8/2010  Jia et al.
8,358,715 B2 *    1/2013  Lim ...................... H04L 1/0662
                                                                      375/267
       (Continued)

FOREIGN PATENT DOCUMENTS

JP          2015080037 A      4/2015

OTHER PUBLICATIONS

Slimane et al, "An Improved Differential Space-Time Block Coding Scheme Based on Viterbi Algorithm", IEEE Communications Letters, vol. 17, No. 9, Sep. 2013.

(Continued)

*Primary Examiner* — Khai M Nguyen

(74) *Attorney, Agent, or Firm* — Perilla Knox & Hildebrandt; Kenneth A. Knox

(57)          ABSTRACT

This application discloses a coding method and apparatus and a readable storage medium. The method includes: performing coding by a coding end through a DSTBC scheme, an NSTBC codebook, and a power sum of transmit symbols on a transmit antenna in previous two symbol periods to obtain a transmit symbol for a current symbol period; and determining, by the coding end, a transmit symbol for a symbol period next to the current symbol period based on the transmit symbol for the current symbol period and the NSTBC codebook, where the previous two symbol periods are two adjacent symbol periods preceding the current symbol period.

20 Claims, 6 Drawing Sheets

(51) Int. Cl.
     *H04B 7/06*          (2006.01)
     *H04L 5/00*          (2006.01)
     *H04L 5/22*          (2006.01)

(52) U.S. Cl.
     CPC .......... *H04L 1/0625* (2013.01); *H04L 1/0637*
            (2013.01); *H04L 1/0668* (2013.01); *H04L*
            *1/0675* (2013.01); *H04L 5/0048* (2013.01);
            *H04L 5/225* (2013.01); *H04B 7/02* (2013.01);
                                   *H04L 1/0662* (2013.01)

(58) Field of Classification Search
     CPC ... H04L 5/0048; H04L 1/0637; H04L 1/0675;
            H04L 5/22; H04B 7/0669; H04B 7/02
     USPC .................. 341/143; 375/262, 265, 340–341
     See application file for complete search history.

(56) References Cited

U.S. PATENT DOCUMENTS

| | | | | |
|---|---|---|---|---|
| 8,553,794 | B2 * | 10/2013 | Wang .................... | H04L 1/0643 |
| | | | | 375/267 |
| 9,716,568 | B2 | 7/2017 | Akutagawa et al. | |
| 10,110,347 | B2 | 10/2018 | Gresset | |
| 2006/0056539 | A1 | 3/2006 | Nam et al. | |
| 2008/0123618 | A1 | 5/2008 | Papadopoulos | |
| 2009/0316830 | A1 | 12/2009 | Rohling et al. | |
| 2015/0295836 | A1 | 10/2015 | Welin et al. | |
| 2016/0134398 | A1 | 5/2016 | Lopez et al. | |
| 2016/0233984 | A1 | 8/2016 | Akutagawa et al. | |
| 2017/0085308 | A1 | 3/2017 | Sun et al. | |
| 2020/0127765 | A1 | 4/2020 | Sasaki et al. | |
| 2020/0382168 | A1 | 12/2020 | Sasaki et al. | |
| 2021/0067393 | A1 | 3/2021 | Masuda | |
| 2021/0083920 | A1 | 3/2021 | Umeda et al. | |
| 2021/0111834 | A1 | 4/2021 | Masuda et al. | |
| 2024/0372650 | A1 | 11/2024 | Huang | |
| 2024/0388382 | A1 | 11/2024 | Huang | |

OTHER PUBLICATIONS

Rania Morsi, "Investigations on Increased Data Rate Differential Space-Time Block Codes for Single Carrier Wireless Systems", arxiv.org, Cornell University Library, 201 Olin Library Cornell University Ithaca,NY 14853, Feb. 8, 2019.

Wang et al, "Non-Unitary Super Orthogonal Differential Space-Time Trellis Coding and Decoding", IEEE Wireless Communications and Networking Conference, 2007, WCNC 2007, Mar. 11-15, 2007, Hong Kong, IEEE Operations Center, Piscataway, NJ.

First Office Action for JP Patent Application No. 2024-542926 of Aug. 5, 2025.

Extended European Search Report for Patent Application No. 22914677.4 of Mar. 17, 2025.

P. Sunil Kumar, M. G. Sumithra, M. Sarumathi, and E. Praveen Kumar, "Performance analysis for PAPR reduction using SLM technique in 2×1 and 2×2 differential STBC MIMO RS-OFDM systems in Rayleigh fading channel," unpublished manuscript, Dept. of ECE, Bannari Amman Institute of Technology, Sathyamangalam, India.

Extended European Search Report for Patent Application No. 22914678.2 of Mar. 17, 2025.

E. Ben Slimane, S. Jarboui, and A. Bouallègue, "Compensation of phase offsets in MIMO systems using an efficient differential STBC," unpublished manuscript, Communication Systems Laboratory, National Engineering School of Tunis, Tunis, Tunisia.

Notice of Allowance for U.S. Appl. No. 18/744,230 of Aug. 8, 2025.

Non-final Office Action for U.S. Appl. No. 18/745,094 of Jul. 10, 2025.

Notice of Allowance for U.S. Appl. No. 18/745,094 of Feb. 5, 2026.

* cited by examiner

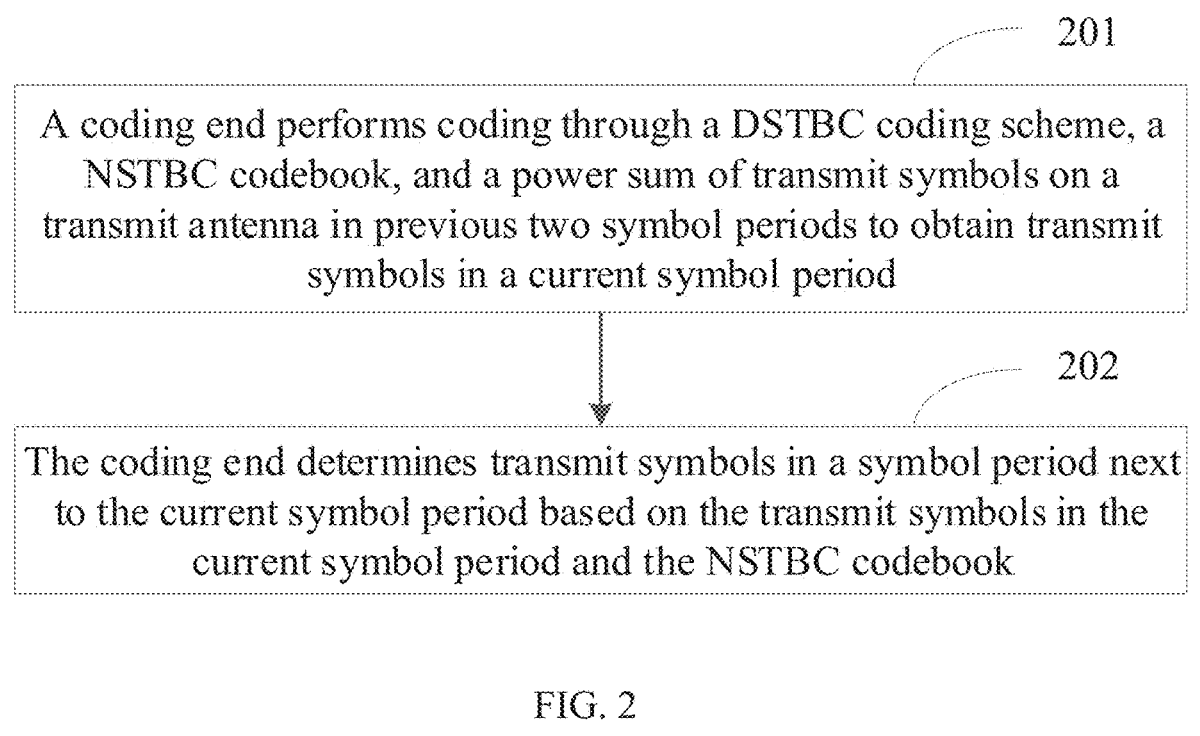

201

A coding end performs coding through a DSTBC coding scheme, a NSTBC codebook, and a power sum of transmit symbols on a transmit antenna in previous two symbol periods to obtain transmit symbols in a current symbol period

202

The coding end determines transmit symbols in a symbol period next to the current symbol period based on the transmit symbols in the current symbol period and the NSTBC codebook

FIG. 2

CODING METHOD AND APPARATUS AND READABLE STORAGE MEDIUM

CROSS-REFERENCE TO RELATED APPLICATIONS

This application is a Bypass continuation application of PCT International Application No. PCT/CN2023/071802 filed on Jan. 11, 2023, which claims priority to Chinese Patent Application No. 202210056640.9, filed in China on Jan. 18, 2022, which are incorporated herein by reference in their entireties.

TECHNICAL FIELD

This application pertains to the field of communication technologies and specifically relates to a coding method and apparatus and a readable storage medium.

BACKGROUND

Conventional orthogonal space time block code (OS-TBC)-type codebooks, including Alamouti code, can achieve full diversity gain and full rate. However, they are designed for conventional active radio frequency communication without considering the modulation characteristics and implementation complexity of passive terminals performing, for example, backscatter communication. Additionally, a decoding end is required to know the channel state information (CSI) between all transmit and receive antennas.

Conventional differential space time block coding is only suitable for constant modulation such as multiple phase shift keying (MPSK). For nonconstant modulations such as amplitude phase shift keying (APSK) or quadrature amplitude modulation (QAM), conventional differential space time block coding and decoding schemes cannot be directly applied due to different energies of symbols in each constellation.

At present, there is an urgent need for a differential space time block coding method that can not only reduce the complexity of system implementation, but also be applicable for nonconstant modulation, without requiring the decoding end to know the CSI between all transmit and receive antennas.

SUMMARY

Embodiments of this application provide a coding method and apparatus and a readable storage medium.

According to a first aspect, a coding method is provided, including:

performing coding by a coding end through a differential space time block coding (DSTBC) scheme, a new space time block coding (NSTBC) codebook, and a power sum of transmit symbols on a transmit antenna in previous two symbol periods to obtain a transmit symbol for a current symbol period, where the previous two symbol periods are two adjacent symbol periods preceding the current symbol period; and determining, by the coding end, a transmit symbol for a symbol period next to the current symbol period based on the transmit symbol for the current symbol period and the NSTBC codebook.

According to a second aspect, a coding apparatus is provided and includes:

a differential coding module configured for a coding end to perform coding through a differential space time block coding DSTBC scheme, a new space time block coding NSTBC codebook, and a power sum of transmit symbols on a transmit antenna in previous two symbol periods to obtain a transmit symbol for a current symbol period, where the previous two symbol periods are two adjacent symbol periods preceding the current symbol period; and an NSTBC coding module configured for the coding end to determine a transmit symbol for a symbol period next to the current symbol period based on the transmit symbol for the current symbol period and the NSTBC codebook.

According to a third aspect, a coding end is provided. The coding end includes a processor and a memory, where the memory has stored thereon a program or instructions capable of running on the processor. When the program or instructions are executed by the processor, the steps of the method according to the first aspect are implemented.

According to a fourth aspect, a coding end is provided, including a processor and a communication interface, where the processor is configured for a coding end to perform coding through a DSTBC scheme, an NSTBC codebook, and a power sum of transmit symbols on a transmit antenna in previous two symbol periods to obtain a transmit symbol for a current symbol period.

The coding end determines a transmit symbol for a symbol period next to the current symbol period based on the transmit symbol for the current symbol period and the NSTBC codebook, where the previous two symbol periods are two adjacent symbol periods preceding the current symbol period.

According to a fifth aspect, a readable storage medium is provided, where the readable storage medium has stored thereon a program or instructions, and when the program or instructions are executed by a processor, the steps of the method according to the first aspect are implemented.

According to a sixth aspect, a chip is provided. The chip includes a processor and a communication interface. The communication interface is coupled to the processor, and the processor is configured to run a program or instructions to implement the method according to the first aspect.

According to a seventh aspect, a computer program product is provided, where the computer program product is stored in a storage medium, and the computer program/program product is executed by at least one processor to implement the steps of the method according to the first aspect.

According to an eighth aspect, a communication device is provided, where the communication device is configured to perform the steps of the method according to the first aspect.

BRIEF DESCRIPTION OF DRAWINGS

FIG. 2 is a schematic flowchart of a coding method according to an embodiment of this application;

DETAILED DESCRIPTION OF EMBODIMENTS

Figure 1A:
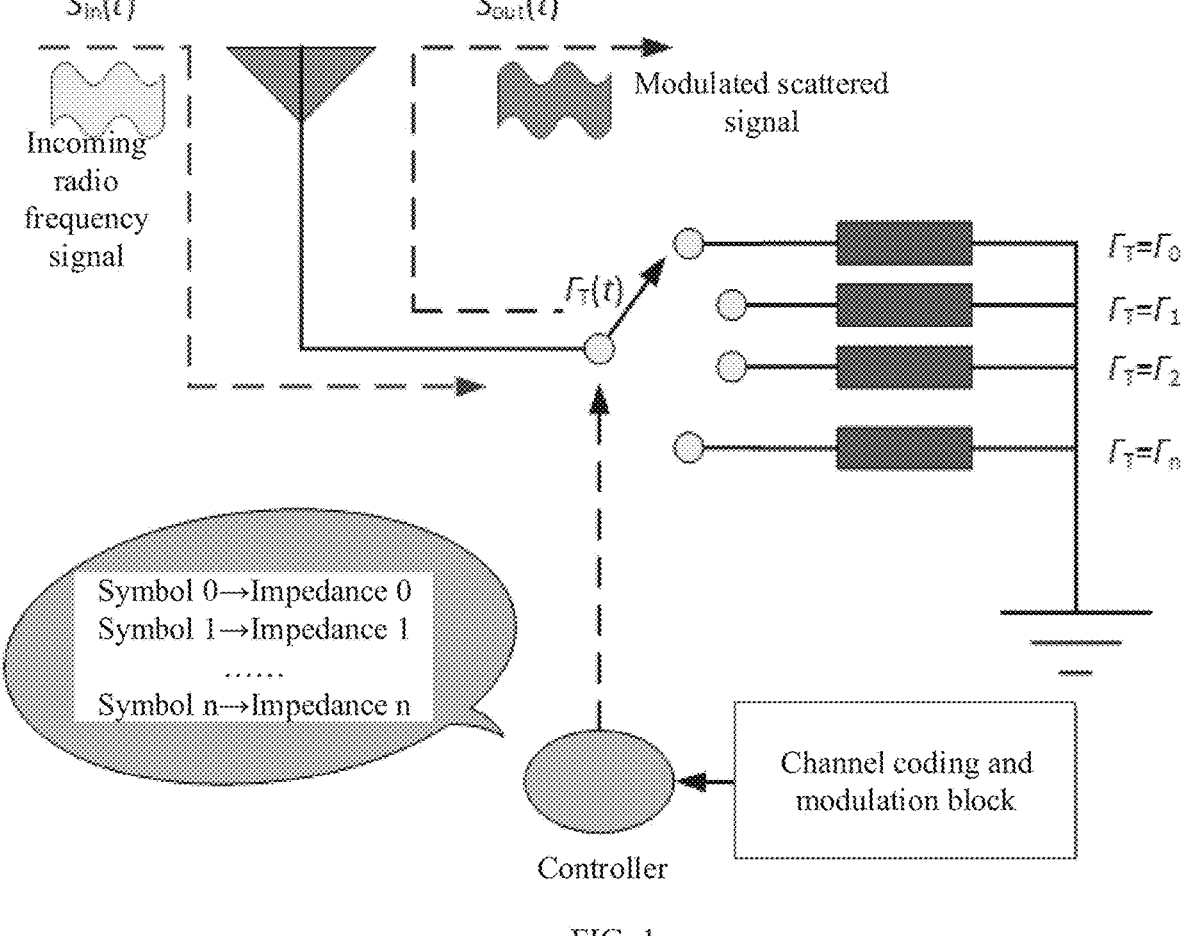
FIG. 1a is a schematic structural diagram of a backscatter communication transmitter.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application fall within the protection scope of this application.

The terms "first", "second", and the like in this specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates that the associated objects have an "or" relationship.

It should be noted that technologies described in the embodiments of this application are not limited to long term evolution (LTE) or LTE-Advanced (LTE-A) systems, and may also be applied to other wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communication system.

In embodiments of this application, a coding end can be deployed on a sending device, which may be, for example, a terminal or a network-side device. The terminal can be a terminal-side device, such as a mobile phone, a tablet personal computer (TPC), a laptop computer (LC) or a notebook computer, a personal digital assistant (PDA), a palmtop computer, a netbook, an ultra-mobile personal computer (UMPC), a mobile Internet device (MID), an augmented reality (AR)/virtual reality (VR) device, a robot, a wearable device (WD), vehicle user equipment (VUE), or pedestrian user equipment (PUE), a smart appliance (a home appliance with a wireless communication function, for example, a refrigerator, a television, a washing machine, or furniture), a game console, a personal computer (PC), a teller machine, or a self-service machine. The wearable device includes a smart watch, a smart band, a smart earphone, smart glasses, smart jewelry (a smart bangle, a smart bracelet, a smart ring, a smart necklace, a smart ankle bangle, a smart anklet, or the like), a smart wristband, smart clothing, or the like. It should be noted that the terminal is not limited to any specific type in the embodiments of this application. The network-side device can include an access network device or core network device, where the access network device can also be referred to as a radio access network device, radio access network (RAN), radio access network function, or radio access network unit. The access network device can include base stations, wireless local area network (WLAN) access points, wireless fidelity (WiFi) nodes, or the like. The base station can be referred to as Node B, evolved Node B (eNB), access point, base transceiver station (BTS), radio base station, radio transceiver, basic service set (BSS), extended service set (ESS), home Node B, home evolved Node B, transmitting receiving point (TRP), or other appropriate terms in the field. As long as the same technical effect is achieved, the base station is not limited to any specific technical terminology. It should be noted that in the embodiments of this application, only the base station in the NR system is introduced as an example, and the specific type of the base station is not limited. The core network device can include but is not limited to at least one of the following: core network node, core network function, mobility management entity (MME), access and mobility management function (AMF), session management function (SMF), user plane function (UPF), policy control function (PCF), policy and charging rules function (PCRF), edge application server discovery function (EASDF), unified data management (UDM), unified data repository (UDR), home subscriber server (HSS), centralized network configuration (CNC), network repository function (NRF), network exposure function (NEF), local NEF (L-NEF), binding support function (BSF), application function (AF), and the like. It should be noted that in the embodiments of this application, only the core network device in the NR system is introduced as an example, and the specific type of the core network device is not limited.

To better understand the technical solution of this application, firstly, the following contents are introduced.

A future 6G communication network needs to support massive Internet of Everything, where the number of Internet of Things devices will reach hundreds of billions, and its connection density will be 10 to 100 times higher than that of the 5th generation (5G) communication system, reaching a connection density of 10 to 100 devices per square meter. Massive Internet of Things devices pose new challenges to both cost and power consumption. Cellular networking, low cost, low power consumption, and even zero power consumption are main trends in the development of Internet of Things devices in the future. Conventional passive terminals are limited by their power consumption and hardware capabilities, and their communication transmission distances are mostly below 10 meters, far from the goal of cellular coverage of 100 meters. Therefore, how the communication distances of passive terminals are effectively increased has become a difficult problem to be solved after the cellular networking of this technology.

Since the amplitude or phase of a signal is controlled by changing the load impedance in backscatter communication (BSC), in considering other non-ideal factors in the backscatter communication modulation circuit, the amplitude or phase of an output signal has more or less errors. However, as long as these signal errors are within a resolvable range, they have no effect on signal demodulation. Therefore, if the number or types of load impedances to be controlled on the antenna are less, the tolerable error can be greater, and the probability of detection errors can be lower. In addition, limited by the power consumption and capacity of a backscatter communication device (BSC UE), it is not desirable in some cases to waste power and resources because of transmitting pilots, that is, the decoding end is required to complete signal demodulation without knowing CSI information.

Backscatter Communication (BSC)

Backscatter communication means that a backscatter communication device uses radio frequency signals from another device or the environment for signal modulation to transmit its own information. A modulation circuit thereof is shown in FIG. 1a. The backscatter communication device controls the reflection coefficient F of the circuit by adjusting its internal impedance, so as to change the amplitude, frequency, and phase of an incident signal to implement signal modulation, where the reflection coefficient of the signal can be characterized as:

$$\Gamma = \frac{Z_1 - Z_0}{Z_1 + Z_0} = |\Gamma|e^{j\theta_T};$$

$Z_0$ is an antenna characteristic impedance, $Z_1$ is the load impedance, j represents a complex number, and $\theta_T$ represents the phase. Assuming that the incident signal is $S_{in}(t)$, the output signal is $S_{out}(t)=S_{in}(t)|\Gamma|e^{j\theta_T}$. Therefore, corresponding amplitude modulation, frequency modulation, or phase modulation can be implemented by controlling the reflection coefficient reasonably. Based on this, a backscatter communication device can be a tag in conventional radio frequency identification (RFID), or passive/semi-passive Internet of Things (IoT). For convenience, they are collectively referred to as BSC UEs herein.

Constant Modulation and Nonconstant Modulation.

Typical modulation techniques can be divided into constant modulation and nonconstant modulation. The so-called constant modulation means that powers or amplitudes of modulated symbol constellation points are the same, and a typical constant modulation is MPSK. However, nonconstant modulation means that powers or amplitudes of modulated symbol constellation points are different, and typical nonconstant modulation includes APSK, QAM, and the like.

Because the typical constant modulation MPSK only distinguishes constellation points in phase dimension, the Euclidean distance between constellation points is relatively small, making them susceptible to interference from noise. In contrast, constellation points in nonconstant modulation such as APSK or QAM extend to the two-dimensional space of amplitude and phase, increasing the Euclidean distance between constellation points and thus enhancing their noise resistance or interference resistance capability. Table 1 shows the difference in signal to noise (Signal-to-Noise Ratio, SNR) between MPSK and MQAM modulation under the same frequency band efficiency or modulation order. As can be seen from the table, at a given bit error ratio (Bit Error Ratio, BER) performance, 64-phase shift keying (PSK) requires an additional 9.95 dB SNR compared with 64QAM to achieve the same BER performance.

TABLE 1

| Modulation order M (bits/channels) | SNR increment |
|---|---|
| 8 (3) | 1.65 dB |
| 16 (4) | 4.2 dB |
| 32 (5) | 7.02 dB |
| 64 (6) | 9.95 dB |

Orthogonal Space Time Block Code (OSTBC)

Space time block code STBC is widely used in cellular communication and wireless local area network. STBC achieves diversity gain and antenna gain without increasing bandwidth by introducing signal redundancy in the space and time domains and constructing a reasonable block coded transmission matrix.

OSTBC is a special linear STBC, and its linear space time block code S satisfies the following single condition:

$$S^H S = \sum_{i=1}^{M} |s_i|^2 I.$$

I represents an identity matrix with dimension M, i represents the i-th element of dimension M, $s_i$ is a diagonal element, elements in the i-th row in S represent symbols transmitted on the i-th transmit antenna within M time instants, and elements in the j-th column in S represent symbols transmitted on $n_t$ antennas at the j-th time instant. Columns in the transmission matrix S satisfying the foregoing formula are mutually orthogonal, which means that transmitted signal sequences on different antennas are also orthogonal, thus ensuring that STBC can achieve full diversity gain at the same time. Its corresponding decoding end only needs to perform simple maximal ratio combining (MRC) to sequentially decouple the transmit symbols from different antennas, and then performs detection and estimation through the maximum likelihood (ML) algorithm.

Figure 1B:
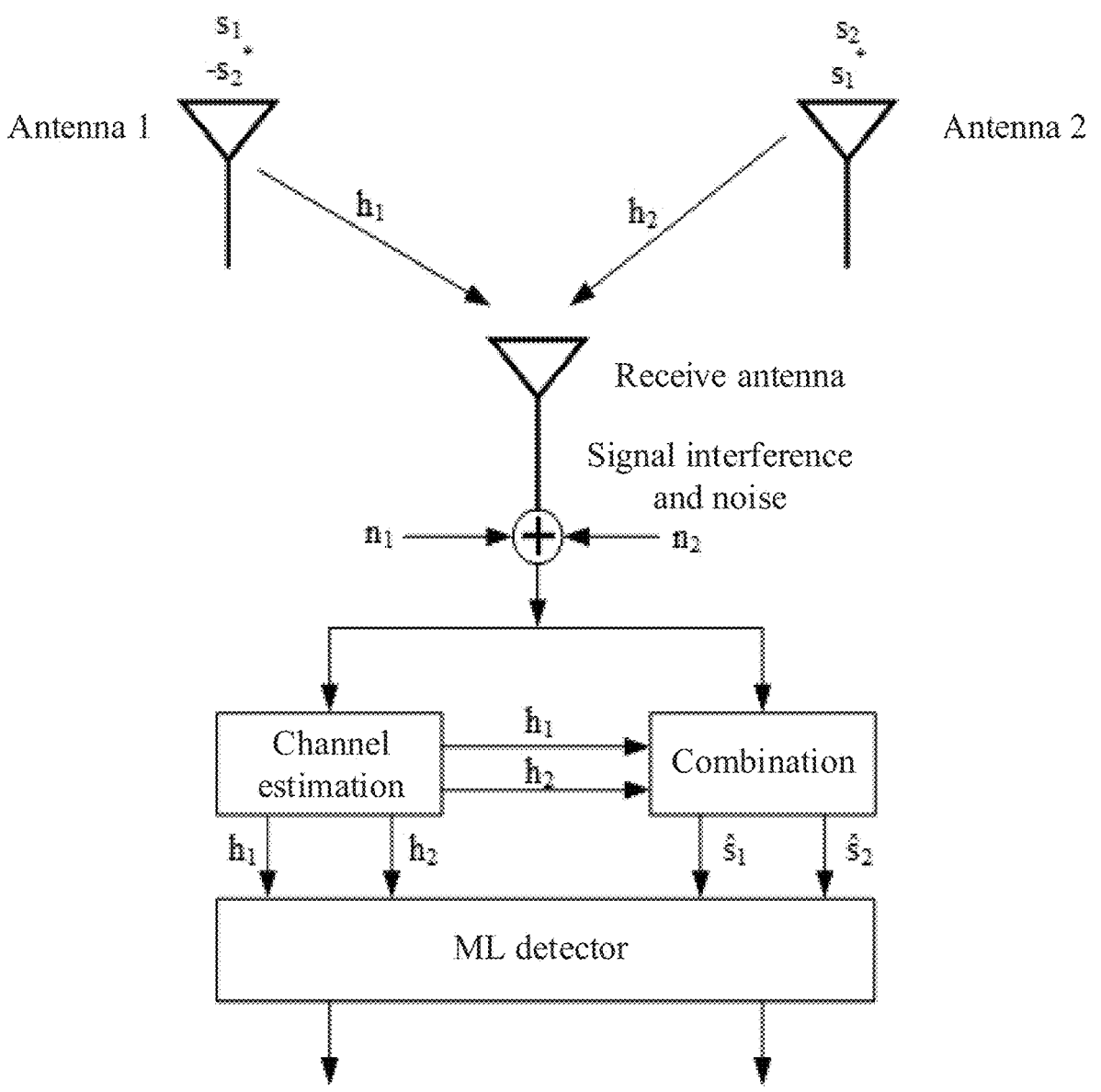
FIG. 1b is a schematic diagram of diversity transmission with Alamouti space time block code.

Alamouti code is the most representative OSTBC code and can achieve full diversity and full rate gain. FIG. 1b is a principle block diagram of Alamouti code. In a given symbol period, two symbols are transmitted on two antennas simultaneously. It is assumed that in the current symbol period, the symbol transmitted on antenna 1 is denoted as $s_1$, and the symbol transmitted on antenna 2 is denoted as $s_2$. However, in the next symbol period, the symbol transmitted on antenna 1 is $$(-s_2^*),$$

and the symbol transmitted on antenna 2 is $s^*_1$, thus forming the following space time block code matrix:

$$S = \begin{bmatrix} s_1 & s_2 \\ -s_2^* & s_1^* \end{bmatrix}$$

It is assumed that channels from two transmit antennas to the receive antennas are represented as $h_1$, $h_2$, respectively, and that they are time-invariant over two adjacent symbol periods, that is:

$$h_1(t) = h_1(t + T) = h_1 = \alpha_1 e^{j\theta_1};$$

and $$h_2(t) = h_2(t + T) = h_2 = \alpha_2 e^{j\theta_1};$$

within the two symbol periods, the received signals on the receive antennas are:

$$r_1 = r(t) = h_1 s_1 + h_2 s_2 + n_1;$$

and $$r_2 = r(t + T) = -h_1 s_2^* + h_2 s_1^* + n_2.$$

7

$n_1$, $n_2$ represents reception noise and signal interference. The decoding end performs combined reception according to the following criteria:

$$\hat{s}_1 = h_1^* r_1 + h_2 r_2^*;$$

and $$\hat{s}_2 = h_2^* r_1 - h_1 r_2^*;$$

substituting the received signals $r_1$, $r_2$ into the above equations, we get:

$$\hat{s}_1 = (\alpha_1^2 + \alpha_2^2)s_1 + h_1^* n_1 + h_2 n_2^*;$$

and $$\hat{s}_2 = (\alpha_1^2 + \alpha_2^2)s_2 - h_1 n_2^* + h_2^* n_1;$$

and finally, the signals $s_1$, $S_2$ can be estimated using an ML detector.

In addition to the typical Alamouti block code, the codebook for a typical two-antenna OSTBC code is shown in Table 2.

TABLE 2

| S | −S | S* | −S* |
|---|---|---|---|
| $\begin{bmatrix} -s_1 & s_2 \\ s_2^* & s_1^* \end{bmatrix}$ | $\begin{bmatrix} s_1 & -s_2 \\ -s_2^* & -s_1^* \end{bmatrix}$ | $\begin{bmatrix} -s_1^* & s_2^* \\ s_2 & s_1 \end{bmatrix}$ | $\begin{bmatrix} s_1^* & -s_2^* \\ -s_2 & -s_1 \end{bmatrix}$ |
| $\begin{bmatrix} s_1 & -s_2 \\ s_2^* & s_1^* \end{bmatrix}$ | $\begin{bmatrix} -s_1 & s_2 \\ -s_2^* & -s_1^* \end{bmatrix}$ | $\begin{bmatrix} s_1^* & -s_2^* \\ s_2 & s_1 \end{bmatrix}$ | $\begin{bmatrix} -s_1^* & -s_2^* \\ -s_2 & -s_1 \end{bmatrix}$ |
| $\begin{bmatrix} s_1 & s_2 \\ s_2^* & -s_1^* \end{bmatrix}$ | $\begin{bmatrix} -s_1 & -s_2 \\ -s_2^* & s_1^* \end{bmatrix}$ | $\begin{bmatrix} s_1^* & s_2^* \\ s_2 & -s_1 \end{bmatrix}$ | $\begin{bmatrix} -s_1^* & -s_2^* \\ -s_2 & s_1 \end{bmatrix}$ |
| $\begin{bmatrix} s_1 & s_2 \\ -s_2^* & s_1^* \end{bmatrix}$ | $\begin{bmatrix} -s_1 & -s_2 \\ s_2^* & -s_1^* \end{bmatrix}$ | $\begin{bmatrix} s_1^* & s_2^* \\ -s_2 & s_1 \end{bmatrix}$ | $\begin{bmatrix} -s_1^* & -s_2^* \\ s_2 & -s_1 \end{bmatrix}$ |

New Space Time Block Code (NSTBC)

In recent years, with the in-depth study of backscatter communication, some researchers have proposed the concept of Backscatter diversity and designed the corresponding space time block code codeword. This type of codeword reduces the complexity of hardware implementation and the probability of detection errors by optimizing the codebook of conventional Alamouti code.

Taking the two-antenna transmit diversity as an example, the codeword matrix S at this point has a dimension of 2×2, and has a coding structure as follows:

$$S_2 = \begin{bmatrix} s_1 & s_2^* \\ s_2 & -s_1^* \end{bmatrix}.$$

According to the foregoing coding structure, it is assumed that in the current symbol period, the symbol transmitted on antenna 1 is denoted as $s_1$, and the symbol transmitted on antenna 2 is denoted as $$s_2^*.$$ However, in the next symbol period, the symbol transmitted on antenna 1 is $s_2$, and the symbol transmitted on antenna 2 is $$(-s_1^*).$$

According to the definition of OSTBC codeword, $S_2$ belongs to OSTBC codeword and thus can achieve full diversity gain and full rate transmission. The following analysis compares differences between this type of codeword and the conventional Alamouti code in backscatter communication.

Assuming that the transmission is based on BPSK modulation symbols, according to the mapping principle of backscatter communication, the mapping rule between symbols 0 and 1 and reflection coefficient is as follows:

$$\begin{cases} 0 \Leftrightarrow \Gamma_1 = |\Gamma|e^{j\theta} \\ 1 \Leftrightarrow \Gamma_2 = |\Gamma|e^{j(\theta+\pi)} \end{cases};$$

that is, symbols 0 and 1 are characterized by controlling the load impedance of two phase inversions. Therefore, a coding table for the diversity coding codeword $S_2$ when two antennas transmit different symbols simultaneously is Table 5. For comparison, Tables 3 and 4 also give coding tables of Alamouti codeword and extended Alamouti codeword when two antennas transmit different symbols at two antennas simultaneously, where the extended Alamouti codeword is:

$$\begin{bmatrix} s_1 & s_2 \\ s_2^* & -s_1^* \end{bmatrix}.$$

TABLE 3

| 00 | Antenna 1 | Antenna 2 | 01 | Antenna 1 | Antenna 2 |
|---|---|---|---|---|---|
| t | $|\Gamma|e^{j\theta}$ | $|\Gamma|e^{-j\theta}$ | t | $|\Gamma|e^{j\theta}$ | $|\Gamma|e^{-j(\theta+\pi)}$ |
| t + T | $|\Gamma|e^{j\theta}$ | $|\Gamma|e^{-j(\theta+\pi)}$ | t + T | $|\Gamma|e^{j(\theta+\pi)}$ | $|\Gamma|e^{-j(\theta+\pi)}$ |
| 10 | Antenna 1 | Antenna 2 | 11 | Antenna 1 | Antenna 2 |
| t | $|\Gamma|e^{j(\theta+\pi)}$ | $|\Gamma|e^{-j\theta}$ | t | $|\Gamma|e^{j(\theta+\pi)}$ | $|\Gamma|e^{-j(\theta+\pi)}$ |
| t + T | $|\Gamma|e^{j\theta}$ | $|\Gamma|e^{-j\theta}$ | t + T | $|\Gamma|e^{j(\theta+\pi)}$ | $|\Gamma|e^{-j\theta}$ |

TABLE 4

| 00 | Antenna 1 | Antenna 2 | 01 | Antenna 1 | Antenna 2 |
|---|---|---|---|---|---|
| t | $|\Gamma|e^{j\theta}$ | $|\Gamma|e^{j\theta}$ | t | $|\Gamma|e^{j\theta}$ | $|\Gamma|e^{j(\theta+\pi)}$ |
| t + T | $|\Gamma|e^{-j(\theta+\pi)}$ | $|\Gamma|e^{-j\theta}$ | t + T | $|\Gamma|e^{-j\theta}$ | $|\Gamma|e^{-j\theta}$ |
| 10 | Antenna 1 | Antenna 2 | 11 | Antenna 1 | Antenna 2 |
| t | $|\Gamma|e^{j(\theta+\pi)}$ | $|\Gamma|e^{j\theta}$ | t | $|\Gamma|e^{j(\theta+\pi)}$ | $|\Gamma|e^{j(\theta+\pi)}$ |
| t + T | $|\Gamma|e^{-j(\theta+\pi)}$ | $|\Gamma|e^{-j(\theta+\pi)}$ | t + T | $|\Gamma|e^{-j\theta}$ | $|\Gamma|e^{-j(\theta+\pi)}$ |

TABLE 5

| 00 | Antenna 1 | Antenna 2 | 01 | Antenna 1 | Antenna 2 |
|---|---|---|---|---|---|
| t | $|\Gamma|e^{j\theta}$ | $|\Gamma|e^{j\theta}$ | t | $|\Gamma|e^{j\theta}$ | $|T|e^{j(\theta+\pi)}$ |
| t + T | $|\Gamma|e^{-j\theta}$ | $|\Gamma|e^{-j(\theta+\pi)}$ | t + T | $|\Gamma|e^{-j(\theta+\pi)}$ | $|\Gamma|e^{-j(\theta+\pi)}$ |

TABLE 5-continued

| 10 | Antenna 1 | Antenna 2 | 11 | Antenna 1 | Antenna 2 |
|---|---|---|---|---|---|
| t | $|\Gamma|e^{j(\theta+\pi)}$ | $|\Gamma|e^{j\theta}$ | t | $|\Gamma|e^{j(\theta+\pi)}$ | $|\Gamma|e^{j(\theta+\pi)}$ |
| t + T | $|\Gamma|e^{-j\theta}$ | $|\Gamma|e^{-j\theta}$ | t + T | $|\Gamma|e^{-j(\theta+\pi)}$ | $|\Gamma|e^{-j\theta}$ |

As can be seen from Table 3, based on a codebook designed for NSTBC, antenna 1 only needs two coefficients $|\Gamma|e^{j\theta}$ and $|\Gamma|e^{j(\theta+\pi)}$; and antenna 2 also only needs two coefficients $|\Gamma|e^{-j\theta}$ and $|\Gamma|^{-j(\theta+\pi)}$. This means that only two load impedances are needed for each antenna. According to Tables 4 and 5, based on the Alamouti codeword and the extended Alamouti codeword, antenna 1 and antenna 2 both need four coefficients $|\Gamma|e^{j\theta}$, $|\Gamma|e^{j(\theta+\pi)}$, $|\Gamma|e^{-j\theta}$, and $|\Gamma|e^{-j(\theta+\pi)}$, which means that 4 load impedances are needed for each antenna. The same method can be extended to scenarios with four or more antennas.

Differential Space Time Block Code (DSTBC)

For conventional OSTBC and NSTBC, the decoding end adopts a decoding scheme of coherent detection, so the decoding end needs precise channel state information (CSI) from the transmit antenna to the receive antenna. However, in scenarios with high-speed mobility or rapidly changing channel fading conditions, or in scenarios in backscatter communication in which it is difficult to transmit pilots due to power and cost constraints in backscatter communication, it becomes challenging for the decoding end to accurately estimate the channel or the cost of accurate channel estimation becomes high. In such cases, the decoding end cannot obtain ideal CSI information. Differential space time block coding is a scheme in which neither the coding end nor the decoding end needs to know CSI information, and the coding and decoding processes are simple while still achieving diversity gain. The following is described with an example using two antennas for transmitting and one antenna for receiving.

At a transmitting and coding end, it is assumed that the coding end transmits the following symbols according to Alamouti scheme in symbol period 1 and symbol period 2:

$$S = \begin{bmatrix} s_1 & s_2 \\ -s_2^* & s_1^* \end{bmatrix}.$$

Information $s_1$, $s_2$ transmitted in these two transmissions carries no information, but only serves as a reference signal. Next, the coding end uses differential coding scheme for transmission. It is assumed that in the (2t−1)-th symbol period, the symbols transmitted from a first antenna and a second antenna are $s_{2t-1}$ and $s_{2t}$, respectively, in the 2t-th symbol period, the symbols transmitted from the first antenna and the second antenna are $$-s_{2t}^*$$

and $$s_{2t-1}^*,$$

respectively. In the (2t+1)-th symbol period, a group of 2 m bits arrive at the coding end, and a corresponding coding coefficient vector (A($\mathcal{D}_{2t+1}$), B($\mathcal{D}_{2t+1}$)) is generated. The coding end calculates the symbol transmitted in the current (2t+1)-th symbol period based on symbol vectors transmitted in the previous two symbol periods and a current coding coefficient vector $$(A(\mathcal{D}_{2t+1}), B(\mathcal{D}_{2t+1})).$$

$$(s_{2t+1}, s_{2t+2}) = A(\mathcal{D}_{2t+1})(s_{2t-1}, s_{2t}) + B(\mathcal{D}_{2t+1})(-s_{2t}^*, s_{2t-1}^*).$$

In addition, according to the Alamouti codebook, the transmit symbols on the two antennas in the (2t+2)-th symbol period are calculated as $-s^*_{2t+2}$ and $$s_{2t+1}^*,$$

respectively, where the coding coefficient vector (A($\mathcal{D}_{2t+1}$), B($\mathcal{D}_{2t+1}$)) satisfies:

$$A(\mathcal{D}_{2t+1}) = s_{2t+1}s_{2t-1}^* + s_{2t+2}s_{2t}^*;$$

and $$B(\mathcal{D}_{2t+1}) = -s_{2t+1}s_{2t} + s_{2t+2}s_{2t-1}.$$

According to the foregoing coding rules, repeated coding is performed on the transmit symbols.

At a receiving and decoding end, it is assumed that signals $r_{2t-1}$, $r_{2t}$, $r_{2t+1}$, $r_{2t+2}$ are received, and a channel matrix is defined as:

$$\Lambda(\alpha_1, \alpha_2) = \begin{pmatrix} \alpha_1 & \alpha_2^* \\ \alpha_2 & -\alpha_1^* \end{pmatrix};$$

and a noise signal is:

$$N_{2t-1} = (\eta_{2t-1}, \eta_{2t}^*);$$

the receive signal can be expressed as:

$$(r_{2t-1}, r_{2t}^*) = (s_{2t-1}, s_{2t})\Lambda(\alpha_1, \alpha_2) + N_{2t-1};$$

and $$(r_{2t+1}, r_{2t+2}^*) = (s_{2t+1}, s_{2t+2})\Lambda(\alpha_1, \alpha_2) + N_{2t+1}.$$

Therefore, we have:

$$(r_{2t+1}, r_{2t+2}^*) \cdot (r_{2t-1}, r_{2t}^*) = (s_{2t+1}, s_{2t+2})\Lambda(\alpha_1, \alpha_2)\Lambda^*(\alpha_1, \alpha_2)(s_{2t-1}^*, s_{2t}^*) +$$
$$(s_{2t+1}, s_{2t+2})\Lambda(\alpha_1, \alpha_2)N_{2t-1}^* + N_{2t+1}\Lambda^*(\alpha_1, \alpha_2)(s_{2t-1}^*, s_{2t}^*) + N_{2t+1}N_{2t-1}^*.$$

After combining and processing, we obtain:

$$r_{2t+1}r_{2t-1}^* + r_{2t+2}^*r_{2t} = (|\alpha_1|^2 + |\alpha_2|^2)(s_{2t+1}s_{2t-1}^* + s_{2t+2}s_{2t}^*) +$$
$$(s_{2t+1}, s_{2t+2})\Lambda(\alpha_1, \alpha_2)N_{2t-1}^* + N_{2t+1}\Lambda^*(\alpha_1, \alpha_2)(s_{2t-1}^*, s_{2t}^*) + N_{2t+1}N_{2t-1}^*.$$

For simplicity, define:

$$\mathcal{R}_1 = r_{2t+1} r_{2t-1}^* + r_{2t+2}^* r_{2t}; \text{ and}$$

$$\mathcal{N}_1 = (s_{2t+1}, s_{2t+2})\Lambda(\alpha_1, \alpha_2)N_{2t-1}^* + N_{2t+1}\Lambda^*(\alpha_1, \alpha_2)(s_{2t-1}^*, s_{2t}^*) + N_{2t+1}N_{2t-1}^*.$$

Thus, we have:

$$\mathcal{R}_1 = \left(|\alpha_1|^2 + |\alpha_2|^2\right)A(\mathcal{D}_{2t-1}) + \mathcal{N}_1.$$

According to the previous mathematical derivation, we have:

$$(s_{2t+1}, s_{2t+2}) = A(\mathcal{D}_{2t+1})(s_{2t-1}, s_{2t}) + B(\mathcal{D}_{2t+1})(-s_{2t}^*, s_{2t-1}^*).$$

Therefore, we have:

$$(r_{2t}, -r_{2t-1}^*) = (-s_{2t}^*, s_{2t-1}^*)\Lambda(\alpha_1, \alpha_2) + N_{2t},$$

$$\text{where } N_{2t} = (\eta_{2t}, -\eta_{2t-1}^*).$$

Signals at four time instants are processed as follows:

$$(r_{2t+1}, r_{2t+2}^*)\cdot(r_{2t}, -r_{2t-1}^*) = (s_{2t+1}, s_{2t+2})\Lambda(\alpha_1, \alpha_2)\Lambda^*(\alpha_1, \alpha_2)(-s_{2t}, s_{2t-1}) +$$

$$(s_{2t+1}, s_{2t+2})\Lambda(\alpha_1, \alpha_2)N_{2t}^* + N_{2t+1}\Lambda^*(\alpha_1, \alpha_2)(-s_{2t}, s_{2t-1}) + N_{2t+1}N_{2t}^*;$$

expand to get:

$$r_{2t+1}r_{2t}^* - r_{2t+2}^* r_{2t-1} = \left(|\alpha_1|^2 + |\alpha_2|^2\right)(-s_{2t+1}s_{2t}^* + s_{2t+2}s_{2t-1}^*) +$$

$$(s_{2t+1}, s_{2t+2})\Lambda(\alpha_1, \alpha_2)N_{2t}^* + N_{2t+1}\Lambda^*(\alpha_1, \alpha_2)(-s_{2t}, s_{2t-1}) + N_{2t+1}N_{2t}^*.$$

For simplicity, define:

$$\mathcal{R}_2 = r_{2t+1}r_{2t}^* - r_{2t+2}^* r_{2t-1}; \text{ and}$$

$$\mathcal{N}_2 = (s_{2t+1}, s_{2t+2})\Lambda(\alpha_1, \alpha_2)N_{2t}^* + N_{2t+1}\Lambda^*(\alpha_1, \alpha_2)(-s_{2t}, s_{2t-1}) + N_{2t+1}N_{2t}^*;$$

We obtain:

$$\mathcal{R}_2 = \left(|\alpha_1|^2 + |\alpha_2|^2\right)B(\mathcal{D}_{2t-1}) + \mathcal{N}_2.$$

Combined with the previous mathematical derivation, we have:

$$(\mathcal{R}_1, \mathcal{R}_2) = \left(|\alpha_1|^2 + |\alpha_2|^2\right)(A(\mathcal{D}_{2t+1}), B(\mathcal{D}_{2t+1})) + (\mathcal{N}_1, \mathcal{N}_2).$$

Since the lengths of all coding coefficient vectors in the coding coefficient vector set $\mathcal{V}$ are equal and $(A(\mathcal{D}_{2t+1}), B(\mathcal{D}_{2t+1}))$ have a one-to-one correspondence with input symbol information, a receiver selects a coding coefficient vector $(\tilde{A}(\mathcal{D}_{2t+1}), \tilde{B}(\mathcal{D}_{2t+1}))$ that has a shortest Euclidean distance to a decision and statistical signal vector ( $\mathcal{R}_1$, $\mathcal{R}_2$) as a decoding output:

$$\left(\tilde{A}(\mathcal{D}_{2t+1}), \tilde{B}(\mathcal{D}_{2t+1})\right) =$$

$$\arg\min_{(A(\mathcal{D}_{2t+1}),B(\mathcal{D}_{2t+1}))\in\mathcal{V}} \|(A(\mathcal{D}_{2t+1}), B(\mathcal{D}_{2t+1})) - (\mathcal{R}_1, \mathcal{R}_2)\|^2.$$

After being calculated, $(A(\mathcal{D}_{2t+1}), B(\mathcal{D}_{2t+1}))$ are mapped back to original symbols, thus recovering original bits.

Conventional OSTBC type codebooks, including Alamouti code, can achieve full diversity gain and full rate. However, they are designed for conventional active radio frequency communication without considering the modulation characteristics and implementation complexity of passive terminals performing, for example, backscatter communication. Additionally, the decoding end is required to know the channel state information CSI between all transmit and receive antennas.

The NSTBC codebook proposed for backscatter communication reduces the complexity of hardware implementation and the probability of detection errors by optimizing the codebook of conventional Alamouti code, but this method requires the decoding end to know the CSI information between all transmit and receive antennas. Although the conventional differential space time block coding based on Alamouti do not need to know the CSI information between all transmit and receive antennas, they do not consider the modulation characteristics and implementation complexity of passive terminals performing, for example, backscatter communication.

Furthermore, the conventional differential space time block coding is only suitable for constant modulation such as MPSK. For nonconstant modulations such as APSK or QAM, conventional differential space time block coding and decoding schemes cannot be directly applied due to different energies of symbols in each constellation. However, considering the constellation shaping gain brought by nonconstant modulation compared with constant modulation and the difference between amplitude modulation and phase modulation capabilities in backscatter communication, it is necessary to solve the coding and decoding problems of differential space time block code based on nonconstant modulation.

The following describes in detail a coding method provided in the embodiments of this application through some embodiments and application scenarios thereof with reference to the accompanying drawings.

Referring to FIG. 2, an embodiment of this application provides a coding method. The method is executed by a coding end, and the coding end may be a terminal device or a network-side device. The method includes:

step 201: A coding end performs coding through a DSTBC scheme, an NSTBC codebook, and a power sum of transmit symbols on a transmit antenna in previous two symbol periods to obtain a transmit symbol for a current symbol period; and step 202: The coding end determines a transmit symbol for a symbol period next to the current symbol period based on the transmit symbol for the current symbol period and the NSTBC codebook.

The previous two symbol periods are two adjacent symbol periods preceding the current symbol period.

In the embodiments of this application, a DSTBC scheme, an NSTBC codebook, and a power sum of transmit symbols on a transmit antenna in previous two symbol periods are used to calculate a transmit symbol for a current symbol period, and additionally, the NSTBC codebook with low complexity is used to calculate a transmit symbol for a next symbol period. Based on DSTBC design, neither a coding end nor a decoding end needs to know CSI, that is, no pilot signal needs to be transmitted on each transmit antenna, thereby reducing system overheads. In calculating the transmit symbol for the current symbol period, normalization is performed for the power sum on the transmit antenna for transmit symbols in the previous two symbol periods, achieving applicability to nonconstant modulation. In addition, the NSTBC codebook can help to reduce the number of load impedance types on the antenna while ensuring diversity gain, reduce the complexity of system implementation, and effectively reduce the probability of detection errors.

The coding method provided in this embodiment of this application is to calculate the symbol for the current symbol period by combining the DSTBC scheme with the NSTBC codebook and performing power normalization, extracting advantages of both, so that no pilot signal needs to be transmitted on each transmit antenna, reducing system overheads, and in addition, achieving applicability to nonconstant modulation and obtaining the constellation shaping gain. Moreover, use of the NSTBC codebook can help to reduce the number of load impedance types on the antenna while ensuring diversity gain, reduce the complexity of system implementation, and effectively reduce the probability of detection errors. This new type of coding method can be called nonconstant differential NSTBC coding method.

In some specific implementations, the nonconstant differential NSTBC coding method in this embodiment of this application can be applied to scenarios with two-antenna transmit diversity.

In some specific implementations, the transmit symbols in this embodiment of this application are constant modulation symbols or nonconstant modulation symbols, where constant modulation at least includes BPSK modulation and multiple phase shift keying (MPSK); and nonconstant modulation at least includes APSK modulation. In other words, the modulation schemes adopted by the coding end can include binary phase shift keying (BPSK) and amplitude phase shift keying (APSK).

In some specific implementations, the NSTBC codebook is used for space-time block coding, or the NSTBC codebook is used for polarization-time block coding, that is, two transmit antennas can be isolated spatially or in polarization.

The polarization mode includes one or more of the following:

horizontal polarization, vertical polarization, left-handed elliptical polarization, right-handed elliptical polarization, left-handed circular polarization, and right-handed circular polarization.

In some specific implementations, a mapping relationship is present between the original bits for the current symbol period and the transmit symbol for the current symbol period.

In this embodiment of this application, the mapping relationship from (M,N)-APSK (taking APSK as an example for illustration) to the NSTBC codebook is first designed, where M represents the amplitude order of APSK and N represents the phase type of APSK. The mapping is performed according to the following criteria:

$0 \rightarrow |\Gamma_1|e^{j\Theta}$; and $1 \rightarrow |\Gamma_2|e^{j\Theta}$;

with an NSTBC codebook structure as follows:

$$S = \begin{bmatrix} S_{12} & S_{34}^* \\ S_{34} & -S_{12}^* \end{bmatrix}$$

Specifically, a two-antenna NSTBC codebook and a four-antenna NSTBC codebook are respectively:

$$S_2 = \begin{bmatrix} s_1 & s_2^* \\ s_2 & -s_1^* \end{bmatrix}$$

$$S_4 = \begin{bmatrix} s_1 & s_2^* & s_3^* & s_4 \\ s_2 & -s_1^* & s_4^* & -s_3 \\ s_3 & s_4^* & -s_1^* & -s_2 \\ s_4 & -s_3^* & -s_2^* & s_1 \end{bmatrix}$$

then, the NSTBC and Alamouti coding tables based on APSK modulation are shown in table 6 and table 7, respectively, where Table 6 is a two-antenna transmit diversity coding table of NSTBC based on (2,1)-APSK modulation, and Table 7 is the two-antenna transmit diversity coding table of Alamouti based on (2,1)-APSK modulation.

TABLE 6

| 00 | Antenna 1 | Antenna 2 | 01 | Antenna 1 | Antenna 2 |
|---|---|---|---|---|---|
| t | $\|\Gamma_1\|e^{j\Theta}$ | $\|\Gamma_1\|e^{-j\Theta}$ | t | $\|\Gamma_1\|e^{j\Theta}$ | $\|\Gamma_2\|e^{-j\Theta}$ |
| t + T | $\|\Gamma_1\|e^{j\Theta}$ | $\|\Gamma_1\|e^{-j(\Theta+\pi)}$ | t + T | $\|\Gamma_2\|e^{j\Theta}$ | $\|\Gamma_1\|e^{-j(\Theta+\pi)}$ |
| 10 | Antenna 1 | Antenna 2 | 11 | Antenna 1 | Antenna 2 |
| t | $\|\Gamma_2\|e^{j\Theta}$ | $\|\Gamma_1\|e^{-j\Theta}$ | t | $\|\Gamma_2\|e^{j\Theta}$ | $\|\Gamma_2\|e^{-j\Theta}$ |
| t + T | $\|\Gamma_1\|e^{j\Theta}$ | $\|\Gamma_2\|e^{-j(\Theta+\pi)}$ | t + T | $\|\Gamma_2\|e^{j\Theta}$ | $\|\Gamma_2\|e^{-j(\Theta+\pi)}$ |

TABLE 7

| 00 | Antenna 1 | Antenna 2 | 01 | Antenna 1 | Antenna 2 |
|---|---|---|---|---|---|
| t | $\|\Gamma_1\|e^{j\Theta}$ | $\|\Gamma_1\|e^{j\Theta}$ | t | $\|\Gamma_1\|e^{j\Theta}$ | $\|\Gamma_2\|e^{j\Theta}$ |
| t + T | $\|\Gamma_1\|e^{-j(\Theta+\pi)}$ | $\|\Gamma_1\|e^{-j\Theta}$ | t + T | $\|\Gamma_2\|e^{-j(\Theta+\pi)}$ | $\|\Gamma_1\|e^{-j\Theta}$ |
| 10 | Antenna 1 | Antenna 2 | 11 | Antenna 1 | Antenna 2 |
| t | $\|\Gamma_2\|e^{j\Theta}$ | $\|\Gamma_1\|e^{j\Theta}$ | t | $\|\Gamma_2\|e^{j\Theta}$ | $\|\Gamma_2\|e^{j\Theta}$ |
| t + T | $\|\Gamma_1\|e^{-j(\Theta+\pi)}$ | $\|\Gamma_2\|e^{-j\Theta}$ | t + T | $\|\Gamma_2\|e^{-j(\Theta+\pi)}$ | $\|\Gamma_2\|e^{-j\Theta}$ |

Compared with the coding tables based on BPSK modulation in Tables 3 to 5, in Tables 6 and 7, based on APSK modulation, there are fewer phase types on some antennas. Taking the NSTBC codebook as an example, for APSK modulation, antenna 1 only needs to support one phase, namely $e^{j\Theta}$, and two amplitudes $|\Gamma_1|$, $|\Gamma_2|$; while for BPSK modulation, antenna 1 needs to support support two phases $e^{j\Theta}$ and $e^{j(\Theta+\pi)}$ and one amplitude $|\Gamma|$. Similarly, for APSK modulation, antenna 2 needs to support two phases $e^{-j\Theta}$ and $e^{-j(\Theta+\pi)}$ and two amplitudes $|\Gamma_1|$, $|\Gamma_2|$; while for BPSK modulation, antenna 2 needs to support two phases $e^{-j\Theta}$ and $e^{-j(\Theta+\pi)}$ and one amplitude $|\Gamma|$. As for the Alamouti codebook, for APSK modulation, antennas 1 and 2 need to support two amplitudes and two phases, while for BPSK modulation, antennas 1 and 2 need to support one amplitude and four phases.

Therefore, compared with BPSK, APSK reduces the number of impedance matching types that support phase modulation by increasing the number of impedance matching types that support amplitude modulation on some antennas, which is beneficial for backscatter communication in some cases in which the amplitude modulation capability is better than the phase modulation capability. In addition, comparing the NSTBC codebook with the Alamouti codebook under the same APSK modulation, antenna 1 in the NSTBC codebook coding table only needs to support one phase, while antenna 1 in the Alamouti codebook coding table needs to support two phases. Therefore, the NSTBC codebook can reduce the number of impedance matching types for phase modulation of the antenna 1.

Similarly, NSTBC and ABBA-class four-antenna transmit diversity coding tables based on APSK modulation are shown in Table 8 and Table 9, respectively, where Table 8 is a four-antenna transmit diversity coding table for NSTBC based on (2,1)-APSK modulation, and Table 9 is a four-antenna transmit diversity coding table for ABBA-class quasi-orthogonal space time block code (QSTBC) based on (2,1)-APSK modulation. The ABBA-class codebook is as follows:

$$\begin{bmatrix} s_1 & s_2 & s_3 & s_4 \\ s_2^* & -s_1^* & s_4^* & -s_3^* \\ s_3 & s_4 & s_1 & s_2 \\ s_4^* & -s_3^* & s_2^* & -s_1^* \end{bmatrix}$$

TABLE 8

0000

| | Antenna 1 | Antenna 2 | Antenna 3 | Antenna 4 |
|---|---|---|---|---|
| t | $|\Gamma_1|e^{j\theta}$ | $|\Gamma_1|e^{-j\theta}$ | $|\Gamma_1|e^{-j\theta}$ | $|\Gamma_1|e^{j\theta}$ |
| t + T | $|\Gamma_1|e^{j\theta}$ | $|\Gamma_1|e^{-j(\theta+\pi)}$ | $|\Gamma_1|e^{-j\theta}$ | $|\Gamma_1|e^{j(\theta+\pi)}$ |
| t + 2T | $|\Gamma_1|e^{j\theta}$ | $|\Gamma_1|e^{-j\theta}$ | $|\Gamma_1|e^{-j(\theta+\pi)}$ | $|\Gamma_1|e^{j(\theta+\pi)}$ |
| t + 3T | $|\Gamma_1|e^{j\theta}$ | $|\Gamma_1|e^{-j(\theta+\pi)}$ | $|\Gamma_1|e^{-j(\theta+\pi)}$ | $|\Gamma_1|e^{j\theta}$ |

0001

| | Antenna 1 | Antenna 2 | Antenna 3 | Antenna 4 |
|---|---|---|---|---|
| t | $|\Gamma_1|e^{j\theta}$ | $|\Gamma_1|e^{-j\theta}$ | $|\Gamma_1|e^{-j\theta}$ | $|\Gamma_2|e^{j\theta}$ |
| t + T | $|\Gamma_1|e^{j\theta}$ | $|\Gamma_1|e^{-j(\theta+\pi)}$ | $|\Gamma_2|e^{-j\theta}$ | $|\Gamma_1|e^{j(\theta+\pi)}$ |
| t + 2T | $|\Gamma_1|e^{j\theta}$ | $|\Gamma_2|e^{-j\theta}$ | $|\Gamma_1|e^{-j(\theta+\pi)}$ | $|\Gamma_1|e^{j(\theta+\pi)}$ |
| t + 3T | $|\Gamma_2|e^{j\theta}$ | $|\Gamma_1|e^{-j(\theta+\pi)}$ | $|\Gamma_1|e^{-j(\theta+\pi)}$ | $|\Gamma_1|e^{j\theta}$ |

0010

| | Antenna 1 | Antenna 2 | Antenna 3 | Antenna 4 |
|---|---|---|---|---|
| t | $|\Gamma_1|e^{j\theta}$ | $|\Gamma_1|e^{-j\theta}$ | $|\Gamma_2|e^{-j\theta}$ | $|\Gamma_1|e^{j\theta}$ |
| t + T | $|\Gamma_1|e^{j\theta}$ | $|\Gamma_1|e^{-j(\theta+\pi)}$ | $|\Gamma_1|e^{-j\theta}$ | $|\Gamma_2|e^{j(\theta+\pi)}$ |
| t + 2T | $|\Gamma_2|e^{j\theta}$ | $|\Gamma_1|e^{-j\theta}$ | $|\Gamma_1|e^{-j(\theta+\pi)}$ | $|\Gamma_1|e^{j(\theta+\pi)}$ |
| t + 3T | $|\Gamma_1|e^{j\theta}$ | $|\Gamma_2|e^{-j(\theta+\pi)}$ | $|\Gamma_1|e^{-j(\theta+\pi)}$ | $|\Gamma_1|e^{j\theta}$ |

0011

| | Antenna 1 | Antenna 2 | Antenna 3 | Antenna 4 |
|---|---|---|---|---|
| t | $|\Gamma_1|e^{j\theta}$ | $|\Gamma_1|e^{-j\theta}$ | $|\Gamma_2|e^{-j\theta}$ | $|\Gamma_2|e^{j\theta}$ |
| t + T | $|\Gamma_1|e^{j\theta}$ | $|\Gamma_1|e^{-j(\theta+\pi)}$ | $|\Gamma_2|e^{-j\theta}$ | $|\Gamma_2|e^{j(\theta+\pi)}$ |
| t + 2T | $|\Gamma_2|e^{j\theta}$ | $|\Gamma_2|e^{-j\theta}$ | $|\Gamma_1|e^{-j(\theta+\pi)}$ | $|\Gamma_1|e^{j(\theta+\pi)}$ |
| t + 3T | $|\Gamma_2|e^{j\theta}$ | $|\Gamma_2|e^{-j(\theta+\pi)}$ | $|\Gamma_1|e^{-j(\theta+\pi)}$ | $|\Gamma_1|e^{j\theta}$ |

0100

| | Antenna 1 | Antenna 2 | Antenna 3 | Antenna 4 |
|---|---|---|---|---|
| t | $|\Gamma_1|e^{j\theta}$ | $|\Gamma_2|e^{-j\theta}$ | $|\Gamma_1|e^{-j\theta}$ | $|\Gamma_1|e^{j\theta}$ |
| t + T | $|\Gamma_2|e^{j\theta}$ | $|\Gamma_1|e^{-j(\theta+\pi)}$ | $|\Gamma_1|e^{-j\theta}$ | $|\Gamma_1|e^{j(\theta+\pi)}$ |
| t + 2T | $|\Gamma_1|e^{j\theta}$ | $|\Gamma_1|e^{-j\theta}$ | $|\Gamma_1|e^{-j(\theta+\pi)}$ | $|\Gamma_2|e^{j(\theta+\pi)}$ |
| t + 3T | $|\Gamma_1|e^{j\theta}$ | $|\Gamma_1|e^{-j(\theta+\pi)}$ | $|\Gamma_2|e^{-j(\theta+\pi)}$ | $|\Gamma_1|e^{j\theta}$ |

0101

| | Antenna 1 | Antenna 2 | Antenna 3 | Antenna 4 |
|---|---|---|---|---|
| t | $|\Gamma_1|e^{j\theta}$ | $|\Gamma_2|e^{-j\theta}$ | $|\Gamma_1|e^{-j\theta}$ | $|\Gamma_2|e^{j\theta}$ |
| t + T | $|\Gamma_2|e^{j\theta}$ | $|\Gamma_1|e^{-j(\theta+\pi)}$ | $|\Gamma_2|e^{-j\theta}$ | $|\Gamma_1|e^{j(\theta+\pi)}$ |
| t + 2T | $|\Gamma_1|e^{j\theta}$ | $|\Gamma_2|e^{-j\theta}$ | $|\Gamma_1|e^{-j(\theta+\pi)}$ | $|\Gamma_2|e^{j(\theta+\pi)}$ |
| t + 3T | $|\Gamma_2|e^{j\theta}$ | $|\Gamma_1|e^{-j(\theta+\pi)}$ | $|\Gamma_2|e^{-j(\theta+\pi)}$ | $|\Gamma_1|e^{j\theta}$ |

0110

| | Antenna 1 | Antenna 2 | Antenna 3 | Antenna 4 |
|---|---|---|---|---|
| t | $|\Gamma_1|e^{j\theta}$ | $|\Gamma_2|e^{-j\theta}$ | $|\Gamma_2|e^{-j\theta}$ | $|\Gamma_1|e^{j\theta}$ |
| t + T | $|\Gamma_2|e^{j\theta}$ | $|\Gamma_1|e^{-j(\theta+\pi)}$ | $|\Gamma_1|e^{-j\theta}$ | $|\Gamma_2|e^{j(\theta+\pi)}$ |
| t + 2T | $|\Gamma_2|e^{j\theta}$ | $|\Gamma_1|e^{-j\theta}$ | $|\Gamma_1|e^{-j(\theta+\pi)}$ | $|\Gamma_2|e^{j(\theta+\pi)}$ |
| t + 3T | $|\Gamma_1|e^{j\theta}$ | $|\Gamma_2|e^{-j(\theta+\pi)}$ | $|\Gamma_2|e^{-j(\theta+\pi)}$ | $|\Gamma_1|e^{j\theta}$ |

0111

| | Antenna 1 | Antenna 2 | Antenna 3 | Antenna 4 |
|---|---|---|---|---|
| t | $|\Gamma_1|e^{j\theta}$ | $|\Gamma_2|e^{-j\theta}$ | $|\Gamma_2|e^{-j\theta}$ | $|\Gamma_2|e^{j\theta}$ |
| t + T | $|\Gamma_2|e^{j\theta}$ | $|\Gamma_1|e^{-j(\theta+\pi)}$ | $|\Gamma_2|e^{-j\theta}$ | $|\Gamma_2|e^{j(\theta+\pi)}$ |
| t + 2T | $|\Gamma_2|e^{j\theta}$ | $|\Gamma_2|e^{-j\theta}$ | $|\Gamma_1|e^{-j(\theta+\pi)}$ | $|\Gamma_2|e^{j(\theta+\pi)}$ |
| t + 3T | $|\Gamma_2|e^{j\theta}$ | $|\Gamma_2|e^{-j(\theta+\pi)}$ | $|\Gamma_2|e^{-j(\theta+\pi)}$ | $|\Gamma_1|e^{j\theta}$ |

1000

| | Antenna 1 | Antenna 2 | Antenna 3 | Antenna 4 |
|---|---|---|---|---|
| t | $|\Gamma_2|e^{j\theta}$ | $|\Gamma_1|e^{-j\theta}$ | $|\Gamma_1|e^{-j\theta}$ | $|\Gamma_1|e^{j\theta}$ |
| t + T | $|\Gamma_1|e^{j\theta}$ | $|\Gamma_2|e^{-j(\theta+\pi)}$ | $|\Gamma_1|e^{-j\theta}$ | $|\Gamma_1|e^{j(\theta+\pi)}$ |
| t + 2T | $|\Gamma_1|e^{j\theta}$ | $|\Gamma_1|e^{-j\theta}$ | $|\Gamma_2|e^{-j(\theta+\pi)}$ | $|\Gamma_1|e^{j(\theta+\pi)}$ |
| t + 3T | $|\Gamma_1|e^{j\theta}$ | $|\Gamma_1|e^{-j(\theta+\pi)}$ | $|\Gamma_1|e^{-j(\theta+\pi)}$ | $|\Gamma_2|e^{j\theta}$ |

1001

| | Antenna 1 | Antenna 2 | Antenna 3 | Antenna 4 |
|---|---|---|---|---|
| t | $|\Gamma_2|e^{j\theta}$ | $|\Gamma_1|e^{-j\theta}$ | $|\Gamma_1|e^{-j\theta}$ | $|\Gamma_2|e^{j\theta}$ |
| t + T | $|\Gamma_1|e^{j\theta}$ | $|\Gamma_2|e^{-j(\theta+\pi)}$ | $|\Gamma_2|e^{-j\theta}$ | $|\Gamma_1|e^{j(\theta+\pi)}$ |
| t + 2T | $|\Gamma_1|e^{j\theta}$ | $|\Gamma_2|e^{-j\theta}$ | $|\Gamma_2|e^{-j(\theta+\pi)}$ | $|\Gamma_1|e^{j(\theta+\pi)}$ |
| t + 3T | $|\Gamma_2|e^{j\theta}$ | $|\Gamma_1|e^{-j(\theta+\pi)}$ | $|\Gamma_1|e^{-j(\theta+\pi)}$ | $|\Gamma_2|e^{j\theta}$ |

1010

| | Antenna 1 | Antenna 2 | Antenna 3 | Antenna 4 |
|---|---|---|---|---|
| t | $|\Gamma_2|e^{j\theta}$ | $|\Gamma_1|e^{-j\theta}$ | $|\Gamma_2|e^{-j\theta}$ | $|\Gamma_1|e^{j\theta}$ |
| t + T | $|\Gamma_1|e^{j\theta}$ | $|\Gamma_2|e^{-j(\theta+\pi)}$ | $|\Gamma_1|e^{-j\theta}$ | $|\Gamma_2|e^{j(\theta+\pi)}$ |
| t + 2T | $|\Gamma_2|e^{j\theta}$ | $|\Gamma_1|e^{-j\theta}$ | $|\Gamma_2|e^{-j(\theta+\pi)}$ | $|\Gamma_1|e^{j(\theta+\pi)}$ |
| t + 3T | $|\Gamma_1|e^{j\theta}$ | $|\Gamma_2|e^{-j(\theta+\pi)}$ | $|\Gamma_1|e^{-j(\theta+\pi)}$ | $|\Gamma_2|e^{j\theta}$ |

1011

| | Antenna 1 | Antenna 2 | Antenna 3 | Antenna 4 |
|---|---|---|---|---|
| t | $|\Gamma_2|e^{j\theta}$ | $|\Gamma_1|e^{-j\theta}$ | $|\Gamma_2|e^{-j\theta}$ | $|\Gamma_2|e^{j\theta}$ |
| t + T | $|\Gamma_1|e^{j\theta}$ | $|\Gamma_2|e^{-j(\theta+\pi)}$ | $|\Gamma_2|e^{-j\theta}$ | $|\Gamma_2|e^{j(\theta+\pi)}$ |
| t + 2T | $|\Gamma_2|e^{j\theta}$ | $|\Gamma_2|e^{-j\theta}$ | $|\Gamma_2|e^{-j(\theta+\pi)}$ | $|\Gamma_1|e^{j(\theta+\pi)}$ |
| t + 3T | $|\Gamma_2|e^{j\theta}$ | $|\Gamma_2|e^{-j(\theta+\pi)}$ | $|\Gamma_1|e^{-j(\theta+\pi)}$ | $|\Gamma_2|e^{j\theta}$ |

1100

| | Antenna 1 | Antenna 2 | Antenna 3 | Antenna 4 |
|---|---|---|---|---|
| t | $|\Gamma_2|e^{j\theta}$ | $|\Gamma_2|e^{-j\theta}$ | $|\Gamma_1|e^{-j\theta}$ | $|\Gamma_1|e^{j\theta}$ |
| t + T | $|\Gamma_2|e^{j\theta}$ | $|\Gamma_2|e^{-j(\theta+\pi)}$ | $|\Gamma_1|e^{-j\theta}$ | $|\Gamma_1|e^{j(\theta+\pi)}$ |
| t + 2T | $|\Gamma_1|e^{j\theta}$ | $|\Gamma_1|e^{-j\theta}$ | $|\Gamma_2|e^{-j(\theta+\pi)}$ | $|\Gamma_2|e^{j(\theta+\pi)}$ |
| t + 3T | $|\Gamma_1|e^{j\theta}$ | $|\Gamma_1|e^{-j(\theta+\pi)}$ | $|\Gamma_2|e^{-j(\theta+\pi)}$ | $|\Gamma_2|e^{j\theta}$ |

1101

| | Antenna 1 | Antenna 2 | Antenna 3 | Antenna 4 |
|---|---|---|---|---|
| t | $|\Gamma_2|e^{j\theta}$ | $|\Gamma_2|e^{-j\theta}$ | $|\Gamma_1|e^{-j\theta}$ | $|\Gamma_2|e^{j\theta}$ |
| t + T | $|\Gamma_2|e^{j\theta}$ | $|\Gamma_2|e^{-j(\theta+\pi)}$ | $|\Gamma_2|e^{-j\theta}$ | $|\Gamma_1|e^{j(\theta+\pi)}$ |
| t + 2T | $|\Gamma_1|e^{j\theta}$ | $|\Gamma_2|e^{-j\theta}$ | $|\Gamma_2|e^{-j(\theta+\pi)}$ | $|\Gamma_2|e^{j(\theta+\pi)}$ |
| t + 3T | $|\Gamma_2|e^{j\theta}$ | $|\Gamma_1|e^{-j(\theta+\pi)}$ | $|\Gamma_2|e^{-j(\theta+\pi)}$ | $|\Gamma_2|e^{j\theta}$ |

1110

| | Antenna 1 | Antenna 2 | Antenna 3 | Antenna 4 |
|---|---|---|---|---|
| t | $|\Gamma_2|e^{j\theta}$ | $|\Gamma_2|e^{-j\theta}$ | $|\Gamma_2|e^{-j\theta}$ | $|\Gamma_1|e^{j\theta}$ |
| t + T | $|\Gamma_2|e^{j\theta}$ | $|\Gamma_2|e^{-j(\theta+\pi)}$ | $|\Gamma_1|e^{-j\theta}$ | $|\Gamma_2|e^{j(\theta+\pi)}$ |
| t + 2T | $|\Gamma_2|e^{j\theta}$ | $|\Gamma_1|e^{-j\theta}$ | $|\Gamma_2|e^{-j(\theta+\pi)}$ | $|\Gamma_2|e^{j(\theta+\pi)}$ |
| t + 3T | $|\Gamma_1|e^{j\theta}$ | $|\Gamma_2|e^{-j(\theta+\pi)}$ | $|\Gamma_2|e^{-j(\theta+\pi)}$ | $|\Gamma_2|e^{j\theta}$ |

1111

| | Antenna 1 | Antenna 2 | Antenna 3 | Antenna 4 |
|---|---|---|---|---|
| t | $|\Gamma_2|e^{j\theta}$ | $|\Gamma_2|e^{-j\theta}$ | $|\Gamma_2|e^{-j\theta}$ | $|\Gamma_2|e^{j\theta}$ |
| t + T | $|\Gamma_2|e^{j\theta}$ | $|\Gamma_2|e^{-j(\theta+\pi)}$ | $|\Gamma_2|e^{-j\theta}$ | $|\Gamma_2|e^{j(\theta+\pi)}$ |
| t + 2T | $|\Gamma_2|e^{j\theta}$ | $|\Gamma_2|e^{-j\theta}$ | $|\Gamma_2|e^{-j(\theta+\pi)}$ | $|\Gamma_2|e^{j(\theta+\pi)}$ |
| t + 3T | $|\Gamma_2|e^{j\theta}$ | $|\Gamma_2|e^{-j(\theta+\pi)}$ | $|\Gamma_2|e^{-j(\theta+\pi)}$ | $|\Gamma_2|e^{j\theta}$ |

TABLE 9

| 0000 | Antenna 1 | Antenna 2 | Antenna 3 | Antenna 4 | 0001 | Antenna 1 | Antenna 2 | Antenna 3 | Antenna 4 |
|---|---|---|---|---|---|---|---|---|---|
| t | $|\Gamma_1|e^{j\theta}$ | $|\Gamma_1|e^{j\theta}$ | $|\Gamma_1|e^{j\theta}$ | $|\Gamma_1|e^{j\theta}$ | t | $|\Gamma_1|e^{j\theta}$ | $|\Gamma_1|e^{j\theta}$ | $|\Gamma_1|e^{j\theta}$ | $|\Gamma_2|e^{j\theta}$ |
| t + T | $|\Gamma_1|e^{-j\theta}$ | $|\Gamma_1|e^{-j(\theta+\pi)}$ | $|\Gamma_1|e^{-j\theta}$ | $|\Gamma_1|e^{-j(\theta+\pi)}$ | t + T | $|\Gamma_1|e^{-j\theta}$ | $|\Gamma_1|e^{-j(\theta+\pi)}$ | $|\Gamma_2|e^{-j\theta}$ | $|\Gamma_1|e^{-j(\theta+\pi)}$ |
| t + 2T | $|\Gamma_1|e^{j\theta}$ | $|\Gamma_1|e^{j\theta}$ | $|\Gamma_1|e^{j\theta}$ | $|\Gamma_1|e^{j\theta}$ | t + 2T | $|\Gamma_1|e^{j\theta}$ | $|\Gamma_2|e^{j\theta}$ | $|\Gamma_1|e^{j\theta}$ | $|\Gamma_1|e^{j\theta}$ |
| t + 3T | $|\Gamma_1|e^{-j\theta}$ | $|\Gamma_1|e^{-j(\theta+\pi)}$ | $|\Gamma_1|e^{-j\theta}$ | $|\Gamma_1|e^{-j(\theta+\pi)}$ | t + 3T | $|\Gamma_2|e^{-j\theta}$ | $|\Gamma_1|e^{-j(\theta+\pi)}$ | $|\Gamma_1|e^{-j\theta}$ | $|\Gamma_1|e^{-j(\theta+\pi)}$ |

| 0100 | Antenna 1 | Antenna 2 | Antenna 3 | Antenna 4 | 0101 | Antenna 1 | Antenna 2 | Antenna 3 | Antenna 4 |
|---|---|---|---|---|---|---|---|---|---|
| t | $|\Gamma_1|e^{j\theta}$ | $|\Gamma_2|e^{j\theta}$ | $|\Gamma_1|e^{j\theta}$ | $|\Gamma_1|e^{j\theta}$ | t | $|\Gamma_1|e^{j\theta}$ | $|\Gamma_2|e^{j\theta}$ | $|\Gamma_1|e^{j\theta}$ | $|\Gamma_2|e^{j\theta}$ |
| t + T | $|\Gamma_2|e^{-j\theta}$ | $|\Gamma_1|e^{-j(\theta+\pi)}$ | $|\Gamma_1|e^{-j\theta}$ | $|\Gamma_1|e^{-j(\theta+\pi)}$ | t + T | $|\Gamma_2|e^{-j\theta}$ | $|\Gamma_1|e^{-j(\theta+\pi)}$ | $|\Gamma_2|e^{-j\theta}$ | $|\Gamma_1|e^{-j(\theta+\pi)}$ |
| t + 2T | $|\Gamma_1|e^{j\theta}$ | $|\Gamma_1|e^{j\theta}$ | $|\Gamma_1|e^{j\theta}$ | $|\Gamma_2|e^{j\theta}$ | t + 2T | $|\Gamma_1|e^{j\theta}$ | $|\Gamma_2|e^{j\theta}$ | $|\Gamma_1|e^{j\theta}$ | $|\Gamma_2|e^{j\theta}$ |
| t + 3T | $|\Gamma_1|e^{-j\theta}$ | $|\Gamma_1|e^{-j(\theta+\pi)}$ | $|\Gamma_2|e^{-j\theta}$ | $|\Gamma_1|e^{-j(\theta+\pi)}$ | t + 3T | $|\Gamma_2|e^{-j\theta}$ | $|\Gamma_1|e^{-j(\theta+\pi)}$ | $|\Gamma_2|e^{-j\theta}$ | $|\Gamma_1|e^{-j(\theta+\pi)}$ |

| 1000 | Antenna 1 | Antenna 2 | Antenna 3 | Antenna 4 | 1001 | Antenna 1 | Antenna 2 | Antenna 3 | Antenna 4 |
|---|---|---|---|---|---|---|---|---|---|
| t | $|\Gamma_2|e^{j\theta}$ | $|\Gamma_1|e^{j\theta}$ | $|\Gamma_1|e^{j\theta}$ | $|\Gamma_1|e^{j\theta}$ | t | $|\Gamma_2|e^{j\theta}$ | $|\Gamma_1|e^{j\theta}$ | $|\Gamma_1|e^{j\theta}$ | $|\Gamma_2|e^{j\theta}$ |
| t + T | $|\Gamma_1|e^{-j\theta}$ | $|\Gamma_2|e^{-j(\theta+\pi)}$ | $|\Gamma_1|e^{-j\theta}$ | $|\Gamma_1|e^{-j(\theta+\pi)}$ | t + T | $|\Gamma_1|e^{-j\theta}$ | $|\Gamma_2|e^{-j(\theta+\pi)}$ | $|\Gamma_2|e^{-j\theta}$ | $|\Gamma_1|e^{-j(\theta+\pi)}$ |
| t + 2T | $|\Gamma_1|e^{j\theta}$ | $|\Gamma_1|e^{j\theta}$ | $|\Gamma_2|e^{j\theta}$ | $|\Gamma_1|e^{j\theta}$ | t + 2T | $|\Gamma_1|e^{j\theta}$ | $|\Gamma_2|e^{j\theta}$ | $|\Gamma_2|e^{j\theta}$ | $|\Gamma_1|e^{j\theta}$ |
| t + 3T | $|\Gamma_1|e^{-j\theta}$ | $|\Gamma_1|e^{-j(\theta+\pi)}$ | $|\Gamma_1|e^{-j\theta}$ | $|\Gamma_2|e^{-j(\theta+\pi)}$ | t + 3T | $|\Gamma_2|e^{-j\theta}$ | $|\Gamma_1|e^{-j(\theta+\pi)}$ | $|\Gamma_1|e^{-j\theta}$ | $|\Gamma_2|e^{-j(\theta+\pi)}$ |

| 1100 | Antenna 1 | Antenna 2 | Antenna 3 | Antenna 4 | 1101 | Antenna 1 | Antenna 2 | Antenna 3 | Antenna 4 |
|---|---|---|---|---|---|---|---|---|---|
| t | $|\Gamma_2|e^{j\theta}$ | $|\Gamma_2|e^{j\theta}$ | $|\Gamma_1|e^{j\theta}$ | $|\Gamma_1|e^{j\theta}$ | t | $|\Gamma_2|e^{j\theta}$ | $|\Gamma_2|e^{j\theta}$ | $|\Gamma_1|e^{j\theta}$ | $|\Gamma_2|e^{j\theta}$ |
| t + T | $|\Gamma_2|e^{-j\theta}$ | $|\Gamma_2|e^{-j(\theta+\pi)}$ | $|\Gamma_1|e^{-j\theta}$ | $|\Gamma_1|e^{-j(\theta+\pi)}$ | t + T | $|\Gamma_2|e^{-j\theta}$ | $|\Gamma_2|e^{-j(\theta+\pi)}$ | $|\Gamma_2|e^{-j\theta}$ | $|\Gamma_1|e^{-j(\theta+\pi)}$ |
| t + 2T | $|\Gamma_1|e^{j\theta}$ | $|\Gamma_1|e^{j\theta}$ | $|\Gamma_2|e^{j\theta}$ | $|\Gamma_2|e^{j\theta}$ | t + 2T | $|\Gamma_1|e^{j\theta}$ | $|\Gamma_2|e^{j\theta}$ | $|\Gamma_2|e^{j\theta}$ | $|\Gamma_2|e^{j\theta}$ |
| t + 3T | $|\Gamma_1|e^{-j\theta}$ | $|\Gamma_1|e^{-j(\theta+\pi)}$ | $|\Gamma_2|e^{-j\theta}$ | $|\Gamma_2|e^{-j(\theta+\pi)}$ | t + 3T | $|\Gamma_2|e^{-j\theta}$ | $|\Gamma_1|e^{-j(\theta+\pi)}$ | $|\Gamma_2|e^{-j\theta}$ | $|\Gamma_2|e^{-j(\theta+\pi)}$ |

| 0000 | Antenna 1 | Antenna 2 | Antenna 3 | Antenna 4 | 0001 | Antenna 1 | Antenna 2 | Antenna 3 | Antenna 4 |
|---|---|---|---|---|---|---|---|---|---|
| t | $|\Gamma_1|e^{j\theta}$ | $|\Gamma_1|e^{j\theta}$ | $|\Gamma_1|e^{j\theta}$ | $|\Gamma_1|e^{j\theta}$ | t | $|\Gamma_1|e^{j\theta}$ | $|\Gamma_1|e^{j\theta}$ | $|\Gamma_1|e^{j\theta}$ | $|\Gamma_2|e^{j\theta}$ |
| t + T | $|\Gamma_1|e^{-j\theta}$ | $|\Gamma_1|e^{-j(\theta+\pi)}$ | $|\Gamma_1|e^{-j\theta}$ | $|\Gamma_1|e^{-j(\theta+\pi)}$ | t + T | $|\Gamma_1|e^{-j\theta}$ | $|\Gamma_1|e^{-j(\theta+\pi)}$ | $|\Gamma_2|e^{-j\theta}$ | $|\Gamma_1|e^{-j(\theta+\pi)}$ |
| t + 2T | $|\Gamma_1|e^{j\theta}$ | $|\Gamma_1|e^{j\theta}$ | $|\Gamma_1|e^{j\theta}$ | $|\Gamma_1|e^{j\theta}$ | t + 2T | $|\Gamma_1|e^{j\theta}$ | $|\Gamma_2|e^{j\theta}$ | $|\Gamma_1|e^{j\theta}$ | $|\Gamma_1|e^{j\theta}$ |
| t + 3T | $|\Gamma_1|e^{-j\theta}$ | $|\Gamma_1|e^{-j(\theta+\pi)}$ | $|\Gamma_1|e^{-j\theta}$ | $|\Gamma_1|e^{-j(\theta+\pi)}$ | t + 3T | $|\Gamma_2|e^{-j\theta}$ | $|\Gamma_1|e^{-j(\theta+\pi)}$ | $|\Gamma_1|e^{-j\theta}$ | $|\Gamma_1|e^{-j(\theta+\pi)}$ |

| 0100 | Antenna 1 | Antenna 2 | Antenna 3 | Antenna 4 | 0101 | Antenna 1 | Antenna 2 | Antenna 3 | Antenna 4 |
|---|---|---|---|---|---|---|---|---|---|
| t | $|\Gamma_1|e^{j\theta}$ | $|\Gamma_2|e^{j\theta}$ | $|\Gamma_1|e^{j\theta}$ | $|\Gamma_1|e^{j\theta}$ | t | $|\Gamma_1|e^{j\theta}$ | $|\Gamma_2|e^{j\theta}$ | $|\Gamma_1|e^{j\theta}$ | $|\Gamma_2|e^{j\theta}$ |
| t + T | $|\Gamma_2|e^{-j\theta}$ | $|\Gamma_1|e^{-j(\theta+\pi)}$ | $|\Gamma_1|e^{-j\theta}$ | $|\Gamma_1|e^{-j(\theta+\pi)}$ | t + T | $|\Gamma_2|e^{-j\theta}$ | $|\Gamma_1|e^{-j(\theta+\pi)}$ | $|\Gamma_2|e^{-j\theta}$ | $|\Gamma_1|e^{-j(\theta+\pi)}$ |
| t + 2T | $|\Gamma_1|e^{j\theta}$ | $|\Gamma_1|e^{j\theta}$ | $|\Gamma_1|e^{j\theta}$ | $|\Gamma_2|e^{j\theta}$ | t + 2T | $|\Gamma_1|e^{j\theta}$ | $|\Gamma_2|e^{j\theta}$ | $|\Gamma_1|e^{j\theta}$ | $|\Gamma_2|e^{j\theta}$ |
| t + 3T | $|\Gamma_1|e^{-j\theta}$ | $|\Gamma_1|e^{-j(\theta+\pi)}$ | $|\Gamma_2|e^{-j\theta}$ | $|\Gamma_1|e^{-j(\theta+\pi)}$ | t + 3T | $|\Gamma_2|e^{-j\theta}$ | $|\Gamma_1|e^{-j(\theta+\pi)}$ | $|\Gamma_2|e^{-j\theta}$ | $|\Gamma_1|e^{-j(\theta+\pi)}$ |

| 1000 | Antenna 1 | Antenna 2 | Antenna 3 | Antenna 4 | 1001 | Antenna 1 | Antenna 2 | Antenna 3 | Antenna 4 |
|---|---|---|---|---|---|---|---|---|---|
| t | $|\Gamma_2|e^{j\theta}$ | $|\Gamma_1|e^{j\theta}$ | $|\Gamma_1|e^{j\theta}$ | $|\Gamma_1|e^{j\theta}$ | t | $|\Gamma_2|e^{j\theta}$ | $|\Gamma_1|e^{j\theta}$ | $|\Gamma_1|e^{j\theta}$ | $|\Gamma_2|e^{j\theta}$ |
| t + T | $|\Gamma_1|e^{-j\theta}$ | $|\Gamma_2|e^{-j(\theta+\pi)}$ | $|\Gamma_1|e^{-j\theta}$ | $|\Gamma_1|e^{-j(\theta+\pi)}$ | t + T | $|\Gamma_1|e^{-j\theta}$ | $|\Gamma_2|e^{-j(\theta+\pi)}$ | $|\Gamma_2|e^{-j\theta}$ | $|\Gamma_1|e^{-j(\theta+\pi)}$ |
| t + 2T | $|\Gamma_1|e^{j\theta}$ | $|\Gamma_1|e^{j\theta}$ | $|\Gamma_2|e^{j\theta}$ | $|\Gamma_1|e^{j\theta}$ | t + 2T | $|\Gamma_1|e^{j\theta}$ | $|\Gamma_2|e^{j\theta}$ | $|\Gamma_2|e^{j\theta}$ | $|\Gamma_1|e^{j\theta}$ |
| t + 3T | $|\Gamma_1|e^{-j\theta}$ | $|\Gamma_1|e^{-j(\theta+\pi)}$ | $|\Gamma_1|e^{-j\theta}$ | $|\Gamma_2|e^{-j(\theta+\pi)}$ | t + 3T | $|\Gamma_2|e^{-j\theta}$ | $|\Gamma_1|e^{-j(\theta+\pi)}$ | $|\Gamma_1|e^{-j\theta}$ | $|\Gamma_2|e^{-j(\theta+\pi)}$ |

| 1100 | Antenna 1 | Antenna 2 | Antenna 3 | Antenna 4 | 1101 | Antenna 1 | Antenna 2 | Antenna 3 | Antenna 4 |
|---|---|---|---|---|---|---|---|---|---|
| t | $|\Gamma_2|e^{j\theta}$ | $|\Gamma_2|e^{j\theta}$ | $|\Gamma_1|e^{j\theta}$ | $|\Gamma_1|e^{j\theta}$ | t | $|\Gamma_2|e^{j\theta}$ | $|\Gamma_2|e^{j\theta}$ | $|\Gamma_1|e^{j\theta}$ | $|\Gamma_2|e^{j\theta}$ |
| t + T | $|\Gamma_2|e^{-j\theta}$ | $|\Gamma_2|e^{-j(\theta+\pi)}$ | $|\Gamma_1|e^{-j\theta}$ | $|\Gamma_1|e^{-j(\theta+\pi)}$ | t + T | $|\Gamma_2|e^{-j\theta}$ | $|\Gamma_2|e^{-j(\theta+\pi)}$ | $|\Gamma_2|e^{-j\theta}$ | $|\Gamma_1|e^{-j(\theta+\pi)}$ |
| t + 2T | $|\Gamma_1|e^{j\theta}$ | $|\Gamma_1|e^{j\theta}$ | $|\Gamma_2|e^{j\theta}$ | $|\Gamma_2|e^{j\theta}$ | t + 2T | $|\Gamma_1|e^{j\theta}$ | $|\Gamma_2|e^{j\theta}$ | $|\Gamma_2|e^{j\theta}$ | $|\Gamma_2|e^{j\theta}$ |
| t + 3T | $|\Gamma_1|e^{-j\theta}$ | $|\Gamma_1|e^{-j(\theta+\pi)}$ | $|\Gamma_2|e^{-j\theta}$ | $|\Gamma_2|e^{-j(\theta+\pi)}$ | t + 3T | $|\Gamma_2|e^{-j\theta}$ | $|\Gamma_1|e^{-j(\theta+\pi)}$ | $|\Gamma_2|e^{-j\theta}$ | $|\Gamma_2|e^{-j(\theta+\pi)}$ | matching types that support amplitude modulation; and compared with the ABBA-class codebook, the NSTBC codebook reduces the number of impedance matching types that support phase modulation for antenna 1. Therefore, APSK modulation is more suitable for backscatter communication in which impedance amplitude modulation is better than impedance phase modulation.

Based on the coding table under the foregoing (M, N)-APSK modulation, differential NSTBC coding under the (M, N)-APSK modulation can be performed according to the following coding rules.

In a specific implementation, the codebook structure of the NSTBC codebook satisfies:

$$\begin{pmatrix} s_{2t+1} & s_{2t+2}^{*} \\ s_{2t+2} & -s_{2t+1}^{*} \end{pmatrix},$$

where $s_{2t+1}$ and $s_{2t+2}^{*}$ are transmit symbols on two transmit antennas obtained by the coding end from coding in the (2t+1)-th symbol period (it should be noted that the transmit symbols may also be called as constellation symbols, constellation points, or the like, and the name is not specifically limited in this embodiment of this application); and $s_{2t+2}$ and $-s_{2t+1}^{*}$ are transmit symbols on two transmit antennas obtained by the coding end from coding in the (2t+2)-th symbol period; where the symbol $$s_{2t+2}^*$$

is the conjugate of the symbol $s_{2t+2}$, and the symbol $$-s_{2t+1}^*$$

is the negative conjugate of the symbol $s_{2t+1}$; and the (2t+1)-th symbol period is the current symbol period, and the (2t+2)-th symbol period is a symbol period next to the current symbol period.

In the specific implementation, the coding end performing coding through a DSTBC scheme and the NSTBC codebook to obtain a transmit symbol for the current symbol period includes:

(1) determining, by the coding end, a coding coefficient vector for the current symbol period through a DSTBC scheme, an NSTBC codebook, and a power of a transmit symbol in a previous symbol period; and (2) determining, by the coding end, a coded transmit symbol for the current symbol period based on the coding coefficient vector for the current symbol period and a power sum of transmit symbols on the symbol transmit antenna in two symbol periods immediately before the current symbol period.

Specifically, for the coding coefficient vector for the current symbol period determined by the coding end in the foregoing (1), two specific implementations are provided in this embodiment of this application as follows.

Implementation 1

(1.1) Based on the formula:

$$A(\mathcal{D}_{2t+1}) = s_{2t+1}s_{2t-1}^* + s_{2t+2}^*s_{2t}, \text{ and}$$

$$B(\mathcal{D}_{2t+1}) = s_{2t+1}s_{2t}^* - s_{2t+2}^*s_{2t-1},$$

the coding end determines the coding coefficient vector (A($\mathcal{D}_{2t+1}$), B($\mathcal{D}_{2t+1}$)) of the coding end for the (2t+1)-th symbol period, where $s_{2t+1}$ and $$s_{2t+2}^*$$

are transmit symbols on two transmit antennas obtained by the coding end from coding in the (2t+1)-th symbol period, $s_{2t-1}$ and $$s_{2t}^*$$

20 are transmit symbols on two transmit antennas obtained by the coding end from coding in the (2t−1)-th symbol period, and $s_{2t}$ and $$-s_{2t-1}^*$$

are transmit symbols on two transmit antennas obtained by the coding end from coding in the 2t-th symbol period.

In this embodiment of this application, the coding end uses a direct calculation method to calculate the coding coefficient vector (A($\mathcal{D}_{2t+1}$), B($\mathcal{D}_{2t+1}$)) for the current symbol period.

Specifically, the coding end determining the coding coefficient vector for the current symbol period in the foregoing (1) further includes:

(1.2) determining, by the coding end, a coding coefficient vector (A($\mathcal{D}_{2t+1}$), B($\mathcal{D}_{2t+1}$)) of the coding end for the (2t+1)-th symbol period based on a preset mapping table between original bits or original symbols and coding coefficient vectors, where the preset mapping table contains the mapping relationship between the original bits or original symbols and (A($\mathcal{D}_{2t+1}$), B($\mathcal{D}_{2t+1}$)) after the determination of initial reference symbols.

The original bits or original symbols refer to initial data bits or initial symbols to be coded, and the initial reference symbols refer to reference symbols on the transmit antenna in an initial symbol period, that is, in the first symbol period.

In this embodiment of this application, the coding end determines (A($\mathcal{D}_{2t+1}$), B($\mathcal{D}_{2t+1}$)) by directly looking up the mapping table.

Specifically, the coding end determining a coded transmit symbol for the current symbol period based on the coding coefficient vector for the current symbol period in the foregoing (2) includes:

(2.1) based on the formula:

$$(s_{2t+1}, s_{2t+2}^*) = \frac{A(\mathcal{D}_{2t+1})(s_{2t-1}, s_{2t}^*) + B(\mathcal{D}_{2t+1})(s_{2t}, -s_{2t-1}^*)}{\left(|s_{2t-1}|^2 + |s_{2t}|^2\right)}$$

determining, by the coding end, transmit symbols on two transmit antennas obtained by the coding end from coding in the (2t+1)-th symbol period, where (A($\mathcal{D}_{2t+1}$), B($\mathcal{D}_{2t+1}$)) is the coding coefficient vector for the (2t+1)-th symbol period determined by the coding end, $s_{2t-1}$ and $s^*_{2t}$ are transmit symbols on two transmit antennas obtained by the coding end from coding in the (2t−1)-th symbol period, $s_{2t}$ and $$-s_{2t-1}^*$$

are transmit symbols on two transmit antennas obtained by the coding end from coding in the 2t-th symbol period, and $|s_{2t-1}|^2 + |s_{2t}|^2$ is the power sum of the transmit symbols on two transmit antennas in the (2t−1)-th symbol period.

In this embodiment of this application, the coding end determines a transmit symbol for the current symbol period through power normalization based on the coding coefficient vector for the current symbol period and the power sum of transmit symbols on the transmit antenna in two symbol periods immediately before the current symbol period.

For example, it is assumed that in the (2t−1)-th symbol period, the symbols transmitted from the first antenna and the second antenna are $s_{2t-1}$ and $$s_{2t}^*,$$

respectively, in the 2t-th symbol period, the symbols transmitted from the first antenna and the second antenna are $s_{2t}$ and $$-s_{2t-1}^*,$$

respectively. In other words, the transmit signals on the two antennas in the (2t−1)-th and 2t-th symbol periods satisfy:

$$\begin{pmatrix} s_{2t-1} & s_{2t}^* \\ s_{2t} & -s_{2t-1}^* \end{pmatrix}.$$

In the (2t+1)-th symbol period, a group of 2 m bits arrive at the coding end, and a corresponding coding coefficient vector $(A(\mathcal{D}_{2t+1}), B(\mathcal{D}_{2t+1}))$ is generated according to the mapping relationship $\mathcal{M}$ (taking looking up a preset mapping table as an example). The coding end calculates the symbol transmitted in the current moment based on symbol vectors transmitted in the previous two symbol periods and the current coding coefficient vector $(A(\mathcal{D}_{2t+1}), B(\mathcal{D}_{2t+1}))$:

$$(s_{2t+1}, s_{2t+2}^*) = \frac{A(\mathcal{D}_{2t+1})(s_{2t-1}, s_{2t}^*) + B(\mathcal{D}_{2t+1})(s_{2t}, -s_{2t-1}^*)}{\left(|s_{2t-1}|^2 + |s_{2t}|^2\right)}$$

In the (2t+2)-th symbol period, the symbols transmitted on the two antennas are $$(s_{2t+2}, -s_{2t+1}^*).$$

The coding coefficient vector $(A(\mathcal{D}_{2t+1}), B(\mathcal{D}_{2t+1}))$ and the current input symbol satisfy the following relationship:

$$A(\mathcal{D}_{2t+1}) = s_{2t+1}s_{2t-1}^* + s_{2t+2}^*s_{2t}; \text{ and}$$

$$B(\mathcal{D}_{2t+1}) = s_{2t+1}s_{2t}^* - s_{2t+2}^*s_{2t-1}.$$

Implementation 2

(1.1) Based on the formula:

$$A(\mathcal{D}_{2t+1}) = \frac{s_{2t+1}s_{2t-1}^* + s_{2t+2}^*s_{2t}}{\sqrt{|s_{2t-1}|^2 + |s_{2t}|^2}}, \text{ and}$$

$$B(\mathcal{D}_{2t+1}) = \frac{s_{2t+1}s_{2t}^* - s_{2t+2}^*s_{2t-1}}{\sqrt{|s_{2t-1}|^2 + |s_{2t}|^2}},$$

the coding end determines the coding coefficient vector $(A(\mathcal{D}_{2t+1}), B(\mathcal{D}_{2t+1}))$ of the coding end for the (2t+1)-th symbol period, where $s_{2t+1}$ and $$s_{2t+2}^*$$

are transmit symbols on two transmit antennas obtained by the coding end from coding in the (2t+1)-th symbol period, $s_{2t-1}$ and $$s_{2t}^*$$

are transmit symbols on two transmit antennas obtained by the coding end from coding in the (2t−1)-th symbol period, $s_{2t}$ and $$-s_{2t-1}^*$$

are transmit symbols on two transmit antennas obtained by the coding end from coding in the 2t-th symbol period, and $\sqrt{|s_{2t-1}|^2 + |s_{2t}|^2}$ is a square root of the power sum of the transmit symbols on two transmit antennas in the (2t−1)-th symbol period.

In this embodiment of this application, the coding end uses a direct calculation method to calculate the coding coefficient vector $(A(\mathcal{D}_{2t+1}), B(\mathcal{D}_{2t+1}))$ for the current symbol period.

Specifically, the coding end determining the coding coefficient vector for the current symbol period in the foregoing (1) further includes:

(1.2) determining, by the coding end, a coding coefficient vector $(A(\mathcal{D}_{2t+1}), B(\mathcal{D}_{2t+1}))$ of the coding end for the (2t+1)-th symbol period based on a preset mapping table between original bits or original symbols and coding coefficient vectors, where the preset mapping table contains the mapping relationship between the original bits or original symbols and $(A(\mathcal{D}_{2t+1}), B(\mathcal{D}_{2t+1}))$ after the determination of initial reference symbols.

Specifically, the coding end determining a coded transmit symbol for the current symbol period based on the coding coefficient vector for the current symbol period in the foregoing (2) includes:

(2.1) based on the formula:

$$(s_{2t+1}, s_{2t+2}^*) = \frac{A(\mathcal{D}_{2t+1})(s_{2t-1}, s_{2t}^*) + B(\mathcal{D}_{2t+1})(s_{2t}, -s_{2t-1}^*)}{\sqrt{|s_{2t-1}|^2 + |s_{2t}|^2}}$$

determining, by the coding end, transmit symbols on two transmit antennas obtained by the coding end from coding in the (2t+1)-th symbol period, where $(A(\mathcal{D}_{2t+1}), B(\mathcal{D}_{2t+1}))$ is the coding coefficient vector for the (2t+1)-th symbol period determined by the coding end, $s_{2t-1}$ and $$s_{2t}^*$$

are transmit symbols on two transmit antennas obtained by the coding end from coding in the (2t−1)-th symbol period, $s_{2t}$ and $$-s_{2t-1}^*$$

are transmit symbols on two transmit antennas obtained by the coding end from coding in the 2t-th symbol period, and $\sqrt{|s_{2t-1}|^2 + s_{2t}|^2}$ is a square root of the power sum of the transmit symbols on two transmit antennas in the (2t−1)-th symbol period.

In this embodiment of this application, the coding end determines a transmit symbol for the current symbol period through power normalization based on the coding coefficient vector for the current symbol period and the power sum of transmit symbols on the transmit antenna in two symbol periods immediately before the current symbol period.

For example, it is assumed that in the (2t−1)-th symbol period, the symbols transmitted from the first antenna and the second antenna are $s_{2t-1}$ and $$s_{2t}^*,$$

respectively, in the 2t-th symbol period, the symbols transmitted from the first antenna and the second antenna are $s_{2t}$ and $$-s_{2t-1}^*,$$

respectively. In other words, the transmit signals on the two antennas in the (2t−1)-th and 2t-th symbol periods satisfy:

$$\begin{pmatrix} s_{2t-1} & s_{2t}^* \\ s_{2t} & -s_{2t-1}^* \end{pmatrix}.$$

In the (2t+1)-th symbol period, a group of 2 m bits arrive at the coding end, and a corresponding coding coefficient vector $(A(\mathcal{D}_{2t+1}), B(\mathcal{D}_{2t+1}))$ is generated according to the mapping relationship $\mathcal{M}$ (taking looking up a default mapping table as an example). The coding end calculates the symbol transmitted in the current moment based on symbol vectors transmitted in the previous two symbol periods and the current coding coefficient vector $(A(\mathcal{D}_{2t+1}), B(\mathcal{D}_{2t+1}))$:

$$(s_{2t+1}, s_{2t+2}^*) = \frac{A(\mathcal{D}_{2t+1})(s_{2t-1}, s_{2t}^*) + B(\mathcal{D}_{2t+1})(s_{2t}, -s_{2t-1}^*)}{\sqrt{|s_{2t-1}|^2 + |s_{2t}|^2}}$$

In the (2t+2)-th symbol period, the symbols transmitted on the two antennas are $$(s_{2t+2}, -s_{2t+1}^*).$$

The coding coefficient vector $(A(\mathcal{D}_{2t+1}), B(\mathcal{D}_{2t+1}))$ and the current input symbol satisfy the following relationship:

$$A(\mathcal{D}_{2t+1}) = \frac{s_{2t+1}s_{2t-1}^* + s_{2t+2}^*s_{2t}}{\sqrt{|s_{2t-1}|^2 + |s_{2t}|^2}}, \text{ and}$$

-continued
$$B(\mathcal{D}_{2t+1}) = \frac{s_{2t+1}s_{2t}^* - s_{2t+2}^*s_{2t-1}}{\sqrt{|s_{2t-1}|^2 + |s_{2t}|^2}}.$$

In a specific implementation, the method further includes:

determining, by the coding end, that transmit symbols on two transmit antennas obtained by the coding end from coding in a first symbol period are $$(s_1, s_2^*),$$

and that transmit symbols on two transmit antennas obtained by the coding end from coding in a second symbol period are $$(s_2, -s_1^*),$$

where $$(s_1, s_2^*) \text{ and } (s_2, -s_1^*)$$

satisfy the following NSTBC codebook:

$$\begin{pmatrix} s_1 & s_2^* \\ s_2 & -s_1^* \end{pmatrix};$$

and $$(s_1, s_2^*)$$

are the initial reference symbols determined.

The foregoing describes the process (including Implementation 1 and Implementation 2) in which the coding end obtains the transmit symbols on two transmit antennas from coding in the (2t+1)-th symbol period. Repeating the foregoing process can complete differential NSTBC coded transmission of all information bits to be transmitted.

It should be noted that, according to the foregoing process, it can be found that in differential NSTBC coding, two symbols can be coded in one symbol period, and transmit symbols in two symbol periods only need to be coded once (because a transmit symbol for a next symbol period can be determined based on the transmit symbol in the current symbol period and the NSTBC codebook), and the next symbol period is redundant to the previous symbol period. Therefore, in practical application scenarios, a delay timer can be set to perform coding processing from the (2t+1)-th symbol period using the differential NSTBC coding method. Then, a symbol period time delay is recorded through the delay timer, and then coding processing is performed from the (2t+3)-th symbol period using the differential NSTBC coding method. This is because the transmit symbol for the (2t+1)-th symbol period and the transmit symbol for the (2t+2)-th symbol period can be determined in one coding process.

The following describes technical solutions of the embodiments in this application with reference to specific implementation examples.

Example 1

An embodiment of this solution takes (2,2)-APSK as an example and explains the coding process of differential NSTBC using the foregoing Implementation 1. It is assumed that (2,2)-APSK modulation is adopted, a set of constellation points is $\{-3, -1, 1, 3\}$, and a set of coding coefficient vectors is $\mathcal{V}$. Let two initial reference modulation signals be $s_1 = 1$ and $s_2 = 3$, and four input bits at a coder input are $c_1 c_2 c_3 c_4$, respectively. According to the mapping rule "00, 01, 10, 11"→$\{1, 3, -1, -3\}$, the first two bits $c_1 c_2$ are mapped into symbols $s_3$, and the last two bits $c_3\ c_4$ are mapped into symbols $s_4$, with the mapping relationship as follows:

$$c_1 c_2 \to s_3 = (-1)^{c_1} \cdot (1 + 2 \times c_2), \ c_1, c_2 = \{0,1\};$$

$$\text{and } c_3 c_4 \to s_4 = (-1)^{c_3} \cdot (1 + 2 \times c_4), \ c_3, c_4 = \{0,1\}.$$

According to the definition of coding coefficient vector, we have:

$$A(\mathcal{D}_3) = s_3 s_1^* + s_4^* s_2; \text{ and}$$

$$B(\mathcal{D}_3) = s_3 s_2^* - s_4^* s_1.$$

According to different values of input bits $c_1$ and $c_2$, the mapping relationship with the coding coefficient vector $(A(\mathcal{D}_3), B(\mathcal{D}_3))$ can be obtained as shown in Table 10.

TABLE 10

| Input bits $(c_1 c_2, c_3 c_4)$ | Coding coefficient vector (A, B) | Input bits $(c_1 c_2, c_3 c_4)$ | Coding coefficient vector (A, B) |
|---|---|---|---|
| (00, 00) | (4, 2) | (10, 00) | (2, −4) |
| (00, 01) | (10, 0) | (10, 01) | (8, −6) |
| (00, 10) | (−2, 4) | (10, 10) | (−4, −2) |
| (00, 11) | (−8, 6) | (10, 11) | (−10, 0) |
| (01, 00) | (6, 8) | (11, 00) | (0, −10) |
| (01, 01) | (12, 6) | (11, 01) | (6, −12) |
| (01, 10) | (0, 10) | (11, 10) | (−6, −8) |
| (01, 11) | (−6, 12) | (11, 11) | (−12, −6) |

It is assumed that the transmit symbols on the two antennas transmitted in the (2t−1)-th symbol period are:

$$s_{2t-1} = 3, \text{ and}$$

$$s_{2t}^* = -1;$$

according to the NSTBC coding rules, transmit symbols on two transmit antennas in the 2t-th symbol period are:

$$s_{2t} = -1, -s_{2t-1}^* = -3.$$

It is assumed that in the (2t+1)-th symbol period, input bits arriving at a coder is 0010, according to the mapping rule between the input bits and the coding coefficient vectors, we have:

$$\mathcal{M}(01,11) = (-2,4);$$

thus, we have: $(A(\mathcal{D}_{2t+1}), B(\mathcal{D}_{2t+1})) = (-2,4)$. The coder calculates symbols transmitted in the current moment based on symbol vectors transmitted in the previous two symbol periods and the current coding coefficient vector $(A(\mathcal{D}_{2t+1}), B(\mathcal{D}_{2t+1}))$:

$$(s_{2t+1}, s_{2t+2}^*) = \frac{(-2) \times (3, -1) + 4 \times (-1, -3)}{\left((3)^2 + (1)^2\right)} = (1, 1).$$

In the (2t+2)-th symbol period, according to the NSTBC coding rules, transmit symbols on two transmit antennas are:

$$s_{2t+2} = 1, \text{ and } -s_{2t+1}^* = -1.$$

The foregoing process is repeated to complete the differential NSTBC coding under APSK.

Example 2

An embodiment of this solution takes (2,2)-APSK as an example and explains the coding process of differential NSTBC using the foregoing Implementation 2. It is assumed that (2,2)-APSK modulation is adopted, a set of constellation points is $\{-3, -1, 1, 3\}$, and a set of coding coefficient vectors is V. Let two initial reference modulation signals be $s_1 = 1$ and $s_2 = 3$, and four input bits at a coder input are $c_1 c_2 c_3 c_4$, respectively. According to the mapping rule "00, 01, 10, 11"→$\{1, 3, -1, -3\}$, the first two bits $c_1 c_2$ are mapped into symbols $s_3$, and the last two bits $c_3 c_4$ are mapped into symbols $s_4$, with the mapping relationship as follows:

$$c_1 c_2 \to s_3 = (-1)^{c_1} \cdot (1 + 2 \times c_2), \ c_1, c_2 = \{0, 1\}; \text{ and}$$

$$c_3 c_4 \to s_4 = (-1)^{c_3} \cdot (1 + 2 \times c_4), \ c_3, c_4 = \{0, 1\}.$$

According to the definition of coding coefficient vector, we have:

$$A(\mathcal{D}_3) = \frac{s_3 s_1^* + s_4^* s_2}{\sqrt{|s_1|^2 + |s_2|^2}}; \text{ and}$$

$$B(\mathcal{D}_3) = \frac{s_3 s_2^* - s_4^* s_1}{\sqrt{|s_1|^2 + |s_2|^2}}.$$

According to different values of input bits $c_1$ and $c_2$, the mapping relationship with the coding coefficient vector $(A(\mathcal{D}_3), B(\mathcal{D}_3))$ can be obtained.

| Input bits $(c_1, c_2, c_3, c_4)$ | Coding coefficient vector (A, B) | Input bits $(c_1, c_2, c_3, c_4)$ | Coding coefficient vector (A, B) |
|---|---|---|---|
| (00, 00) | $\frac{1}{\sqrt{10}} \times (4, 2)$ | (10, 00) | $\frac{1}{\sqrt{10}} \times (2, -4)$ |
| (00, 01) | $\frac{1}{\sqrt{10}} \times (10, 0)$ | (10, 01) | $\frac{1}{\sqrt{10}} \times (8, -6)$ |
| (00, 10) | $\frac{1}{\sqrt{10}} \times (-2, 4)$ | (10, 10) | $\frac{1}{\sqrt{10}} \times (-4, -2)$ |
| (00, 11) | $\frac{1}{\sqrt{10}} \times (-8, 6)$ | (10, 11) | $\frac{1}{\sqrt{10}} \times (-10, 0)$ |
| (01, 00) | $\frac{1}{\sqrt{10}} \times (6, 8)$ | (11, 00) | $\frac{1}{\sqrt{10}} \times (0, -10)$ |
| (01, 01) | $\frac{1}{\sqrt{10}} \times (12, 6)$ | (11, 01) | $\frac{1}{\sqrt{10}} \times (6, -12)$ |
| (01, 10) | $\frac{1}{\sqrt{10}} \times (0, 10)$ | (11, 10) | $\frac{1}{\sqrt{10}} \times (-6, -8)$ |
| (01, 11) | $\frac{1}{\sqrt{10}} \times (-6, 12)$ | (11, 11) | $\frac{1}{\sqrt{10}} \times (-12, -6)$ |

It is assumed that the transmit symbols on the two antennas transmitted in the (2t−1)-th symbol period are:

$s_{2t+1} = 3$, and $$s_{2t}^* = -1;$$

according to the NSTBC coding rules, transmit symbols on two transmit antennas in the 2t-th symbol period are:

$$s_{2t} = -1, -s_{2t-1}^* = -3.$$

It is assumed that in the (2t+1)-th symbol period, input bits arriving at a coder is 1110, according to the mapping rule between the input bits and the coding coefficient vectors, we have:

$$\mathcal{M}(01, 11) = \left(\frac{-6}{\sqrt{10}}, \frac{-8}{\sqrt{10}}\right);$$

thus, we have:

$$(A(\mathcal{D}_{2t+1}), B(\mathcal{D}_{2t+1})) = \left(\frac{-6}{\sqrt{10}}, \frac{-8}{\sqrt{10}}\right).$$

The coder calculates symbols transmitted in the current moment based on symbol vectors transmitted in the previous two symbol periods and the current coding coefficient vector $(A(\mathcal{D}_{2t+1}), B(\mathcal{D}_{2t+1}))$:

$$(s_{2t+1}, s_{2t+2}^*) = \frac{\left(\frac{-6}{\sqrt{10}}\right) \times (3, -1) + \left(\frac{-8}{\sqrt{10}}\right) \times (-1, -3)}{\sqrt{10}} = (-1, 3).$$

In the (2t+2)-th symbol period, according to the NSTBC coding rules, transmit symbols on two transmit antennas are:

$$s_{2t+2} = 3, \text{ and } -s_{2t+1}^* = 1.$$

The foregoing process is repeated to complete the differential NSTBC coding under (2,2)-APSK.

The coding method provided in this embodiment of this application can be executed by a coding apparatus. In the embodiments of this application, the coding method being executed by the coding apparatus is used as an example to describe the coding apparatus provided in an embodiment of this application.

Figure 3:
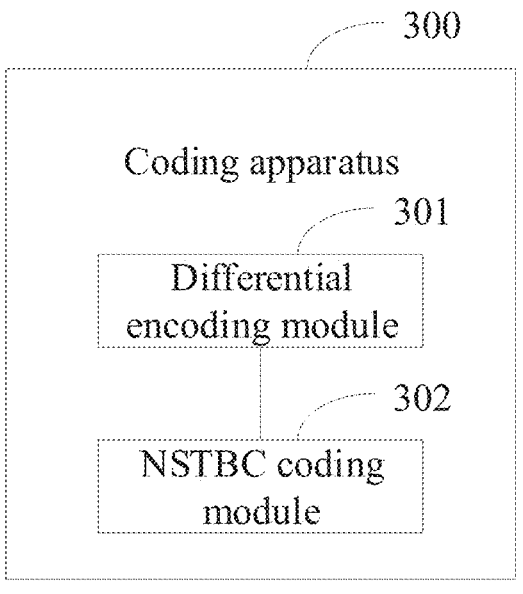
FIG. 3 is a schematic structural diagram of a coding apparatus according to an embodiment of this application.

Referring to FIG. 3, an embodiment of this application provides a coding apparatus 300, including:

a differential coding module 301 configured for a coding end to perform coding through a differential space time block coding DSTBC scheme, a new space time block coding NSTBC codebook, and a power sum of transmit symbols on a transmit antenna in previous two symbol periods to obtain a transmit symbol for a current symbol period; and an NSTBC coding module 302 configured for the coding end to determine a transmit symbol for a symbol period next to the current symbol period based on the transmit symbol for the current symbol period and the NSTBC codebook, where the previous two symbol periods are two adjacent symbol periods preceding the current symbol period.

In the embodiments of this application, a DSTBC scheme, an NSTBC codebook, and a power sum of transmit symbols on a transmit antenna in previous two symbol periods are used to calculate a transmit symbol for a current symbol period, and additionally, the NSTBC codebook with low complexity is used to calculate a transmit symbol for a next symbol period. Based on DSTBC design, neither a coding end nor a decoding end needs to know CSI, that is, no pilot signal needs to be transmitted on each transmit antenna, thereby reducing system overheads. In calculating the transmit symbol for the current symbol period, normalization is performed for the power sum of the transmit symbols on the transmit antenna in the previous two symbol periods, achieving applicability to nonconstant modulation. In addition, the NSTBC codebook can help to reduce the number of load impedance types on the antenna while ensuring diversity gain, reduce the complexity of system implementation, and effectively reduce the probability of detection errors.

In a specific implementation, the codebook structure of the NSTBC codebook satisfies:

$$\begin{pmatrix} s_{2t+1} & s_{2t+2}^* \\ s_{2t+2} & -s_{2t+1}^* \end{pmatrix},$$

$s_{2t+1}$ and $s_{2t+2}^*$ are transmit symbols on two transmit antennas obtained by the coding end from coding in the (2t+1)-th symbol period; and $s_{2t+2}$ and $$-s_{2t+1}^*$$

are transmit symbols on two transmit antennas obtained by the coding end from coding in the (2t+2)-th symbol period; where the symbol $$s_{2t+2}^*$$

is the conjugate of the symbol $s_{2t+2}$, and the symbol $$-s_{2t+1}^*$$

is the negative conjugate of the symbol $s_{2t+1}$; and the (2t+1)-th symbol period is the current symbol period, and the (2t+2)-th symbol period is a symbol period next to the current symbol period.

In a specific implementation, the differential coding module and the NSTBC coding module are specifically configured for the coding end to:

determine a coding coefficient vector for the current symbol period through a DSTBC scheme, an NSTBC codebook, and a power of a transmit symbol in a previous symbol period, and determine a coded transmit symbol for the current symbol period; and determine a transmit symbol for a symbol period next to the current symbol period based on the coded transmit symbol for the current symbol period.

In a specific implementation, the differential coding module is specifically configured for the coding end to:

based on the formula:

$$(s_{2t+1}, s_{2t+2}^*) = \frac{A(\mathcal{D}_{2t+1})(s_{2t-1}, s_{2t}^*) + B(\mathcal{D}_{2t+1})(s_{2t}, -s_{2t-1}^*)}{\left(|s_{2t-1}|^2 + |s_{2t}|^2\right)}$$

determine transmit symbols on two transmit antennas obtained by the coding end from coding in the (2t+1)-th symbol period; where $(A(\mathcal{D}_{2t+1}), B(\mathcal{D}_{2t+1}))$ is the coding coefficient vector for the (2t+1)-th symbol period determined by the coding end, $s_{2t-1}$ and $$s_{2t}^*$$

are transmit symbols on two transmit antennas obtained by the coding end from coding in the (2t−1)-th symbol period, $s_{2t}$ and $$-s_{2t-1}^*$$

are transmit symbols on two transmit antennas obtained by the coding end from coding in the 2t-th symbol period, and $|s_{2t-1}|^2+|s_{2t}|^2$ is the power sum of the transmit symbols on two transmit antennas in the (2t−1)-th symbol period.

In a specific implementation, the differential coding module is specifically configured for the coding end to:

based on the formula:

$$A(\mathcal{D}_{2t+1}) = s_{2t+1}s_{2t-1}^* + s_{2t+2}^*s_{2t}, \text{ and}$$

$$B(\mathcal{D}_{2t+1}) = s_{2t+1}s_{2t}^* - s_{2t+2}^*s_{2t-1},$$

determine the coding coefficient vector $(A(\mathcal{D}_{2t+1}), B(\mathcal{D}_{2t+1}))$ of the coding end for the (2t+1)-th symbol period, where $s_{2t+1}$ and $$s_{2t+2}^*$$

are transmit symbols on two transmit antennas obtained by the coding end from coding in the (2t+1)-th symbol period, $s_{2t-1}$ and $$s_{2t}^*$$

are transmit symbols on two transmit antennas obtained by the coding end from coding in the (2t−1)-th symbol period, and $s_{2t}$ and $$-s_{2t-1}^*$$

are transmit symbols on two transmit antennas obtained by the coding end from coding in the 2t-th symbol period.

In a specific implementation, the differential coding module is specifically configured for the coding end to:

determine a coding coefficient vector $(A(\mathcal{D}_{2t+1}), B(\mathcal{D}_{2t+1}))$ of the coding end for the (2t+1)-th symbol period based on a preset mapping table between original bits or original symbols and coding coefficient vectors, where the preset mapping table contains the mapping relationship between the original bits or symbols and $(A(\mathcal{D}_{2t+1}), B(\mathcal{D}_{2t+1}))$ after the determination of initial reference symbols.

In a specific implementation, the differential coding module is specifically further configured for the coding end to:

based on the formula:

$$(s_{2t+1}, s_{2t+2}^*) = \frac{A(\mathcal{D}_{2t+1})(s_{2t-1}, s_{2t}^*) + B(\mathcal{D}_{2t+1})(s_{2t}, -s_{2t-1}^*)}{\sqrt{|s_{2t-1}|^2 + |s_{2t}|^2}}$$

determine transmit symbols on two transmit antennas obtained by the coding end from coding in the (2t+1)-th symbol period; where $(A(\mathcal{D}_{2t+1}), B(\mathcal{D}_{2t+1}))$ is the coding coefficient vector for the (2t+1)-th symbol period determined by the coding end, $s_{2t-1}$ and $$s^*_{2t}$$

are transmit symbols on two transmit antennas obtained by the coding end from coding in the (2t−1)-th symbol period, $s_{2t}$ and $$-s^*_{2t-1}$$

are transmit symbols on two transmit antennas obtained by the coding end from coding in the 2t-th symbol period, and $\sqrt{|s_{2t-1}|^2 + |s_{2t}|^2}$ is a square root of the power sum of the transmit symbols on two transmit antennas in the (2t−1)-th symbol period.

In a specific implementation, the differential coding module may be specifically further configured for the coding end to:

based on the formula:

$$A(\mathcal{D}_{2t+1}) = \frac{s_{2t+1}s^*_{2t-1} + s^*_{2t+2}s_{2t}}{|s_{2t-1}|^2 + |s_{2t}|^2}, \text{ and}$$

$$B(\mathcal{D}_{2t+1}) = \frac{s_{2t+1}s^*_{2t} - s^*_{2t+2}s_{2t-1}}{|s_{2t-1}|^2 + |s_{2t}|^2},$$

determine the coding coefficient vector $(A(\mathcal{D}_{2t+1}), B(\mathcal{D}_{2t+1}))$ of the coding end for the (2t+1)-th symbol period, where $s_{2t+1}$ and $$s^*_{2t+2}$$

are transmit symbols on two transmit antennas obtained by the coding end from coding in the (2t+1)-th symbol period, $s_{2t-1}$ and $$s^*_{2t}$$

are transmit symbols on two transmit antennas obtained by the coding end from coding in the (2t−1)-th symbol period, and $s_{2t}$ and $$-s^*_{2t-1}$$

are transmit symbols on two transmit antennas obtained by the coding end from coding in the 2t-th symbol period.

In a specific implementation, the differential coding module is specifically further configured for the coding end to:

determine a coding coefficient vector $(A(\mathcal{D}_{2t+1}), B(\mathcal{D}_{2t+1}))$ of the coding end for the (2t+1)-th symbol period based on a preset mapping table between original bits or original symbols and coding coefficient vectors, where the preset mapping table contains the mapping relationship between the original bits or symbols and $(A(\mathcal{D}_{2t+1}), B(\mathcal{D}_{2t+1}))$ after the determination of initial reference symbols.

In a specific implementation, the NSTBC coding module is specifically configured to:

determine, by the coding end, a transmit symbol for a symbol period next to the current symbol period based on the transmit symbol for the current symbol period obtained from coding and the NSTBC codebook. After obtaining the transmit symbols $s_{2t+1}$ and $$s^*_{2t+2}$$

on two transmit antennas in the (2t+1)-th symbol period from coding, according to the NSTBC codebook structure, the coding end $$\begin{pmatrix} s_{2t+1} & s^*_{2t+2} \\ s_{2t+2} & -s^*_{2t+1} \end{pmatrix}$$

performs coding to obtain transmit symbols $s_{2t+2}$ and $$-s^*_{2t+1}$$

on two transmit antennas in the (2t+2)-th symbol period.

In a specific implementation, the apparatus further includes:

a first determining module configured to determine, by the coding end, that transmit symbols on two transmit antennas obtained by the coding end from coding in a first symbol period are $$(s_1, s^*_2),$$

and that transmit symbols on two transmit antennas obtained by the coding end from coding in a second symbol period are $$(s_2, -s^*_1),$$

where $$(s_1, s^*_2) \text{ and } (s_2, -s^*_1)$$

satisfy the following NSTBC codebook:

$$\begin{pmatrix} s_1 & s^*_2 \\ s_2 & -s^*_1 \end{pmatrix};$$

and $$(s_1, s^*_2)$$

are the initial reference symbols determined.

In a specific implementation, a mapping relationship is present between the original bits for the current symbol period and the transmit symbol for the current symbol period.

In a specific implementation, the NSTBC codebook is used for space-time block coding, or the NSTBC codebook is used for polarization-time block coding, that is, two transmit antennas can be isolated spatially or in polarization.

In a specific implementation, the transmit symbols are constant modulation symbols or nonconstant modulation symbols.

The constant modulation at least includes BPSK modulation.

The nonconstant modulation at least includes APSK modulation.

The coding apparatus in this embodiment of this application may be an electronic device such as an electronic device with an operating system, or a component in an electronic device such as an integrated circuit or chip. The electronic device may be a terminal or a device other than terminals. For example, the terminal may include but is not limited to the types of the terminal listed above, and the other devices may be servers, network attached storage (NAS), or the like, which are not specifically limited in this embodiment of this application.

The coding apparatus provided in this embodiment of this application can implement the processes implemented in the method embodiment in FIG. 2, with the same technical effects achieved. To avoid repetition, details are not repeated herein.

Figure 4:
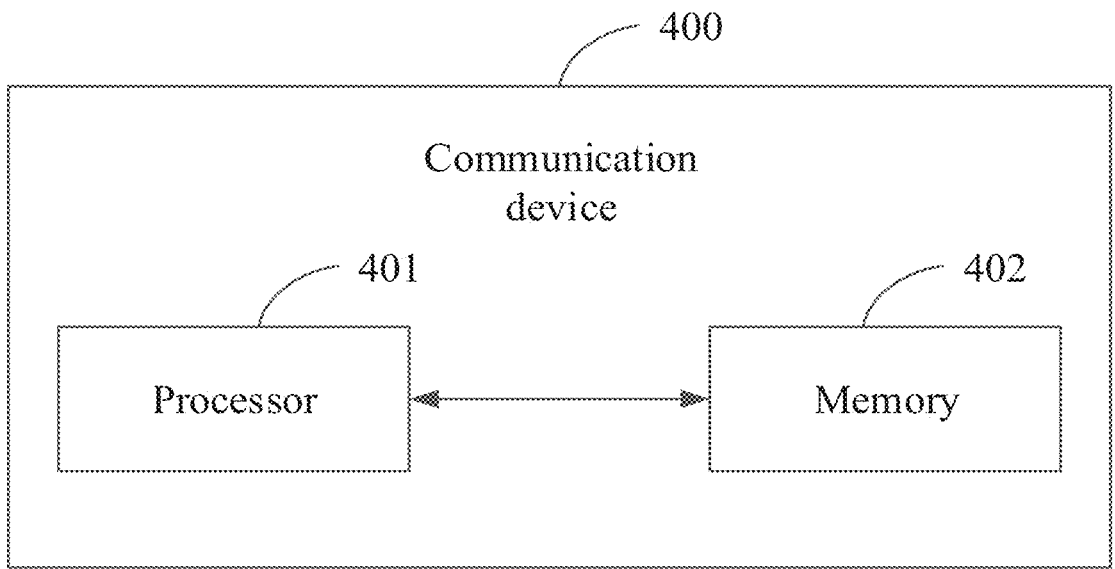
FIG. 4 is a schematic structural diagram of a communication device according to an embodiment of this application.

Optionally, as shown in FIG. 4, an embodiment of this application further provides a communication device 400 including a processor 401 and a memory 402. The memory 402 has stored thereon a program or instructions capable of running on the processor 401. For example, if the communication device 400 is a terminal, when the program or instructions are executed by the processor 401, the steps of the foregoing embodiment of the coding method are implemented, with the same technical effects achieved. To avoid repetition, details are not repeated herein. When the communication device 400 is a network-side device, the program or instructions are executed by the processor 401 to implement the steps of the foregoing embodiment of the coding method, with the same technical effects achieved. To avoid repetition, details are not repeated herein.

In the embodiments of this application, a DSTBC scheme, an NSTBC codebook, and a power sum of transmit symbols on a transmit antenna in previous two symbol periods are used to calculate a transmit symbol for a current symbol period, and additionally, the NSTBC codebook with low complexity is used to calculate a transmit symbol for a next symbol period. Based on DSTBC design, neither a coding end nor a decoding end needs to know CSI, that is, no pilot signal needs to be transmitted on each transmit antenna, thereby reducing system overheads. In calculating the transmit symbol for the current symbol period, normalization is performed for the power sum of the transmit symbols on the transmit antenna in the previous two symbol periods, achieving applicability to nonconstant modulation. In addition, the NSTBC codebook can help to reduce the number of load impedance types on the antenna while ensuring diversity gain, reduce the complexity of system implementation, and effectively reduce the probability of detection errors.

Figure 5:
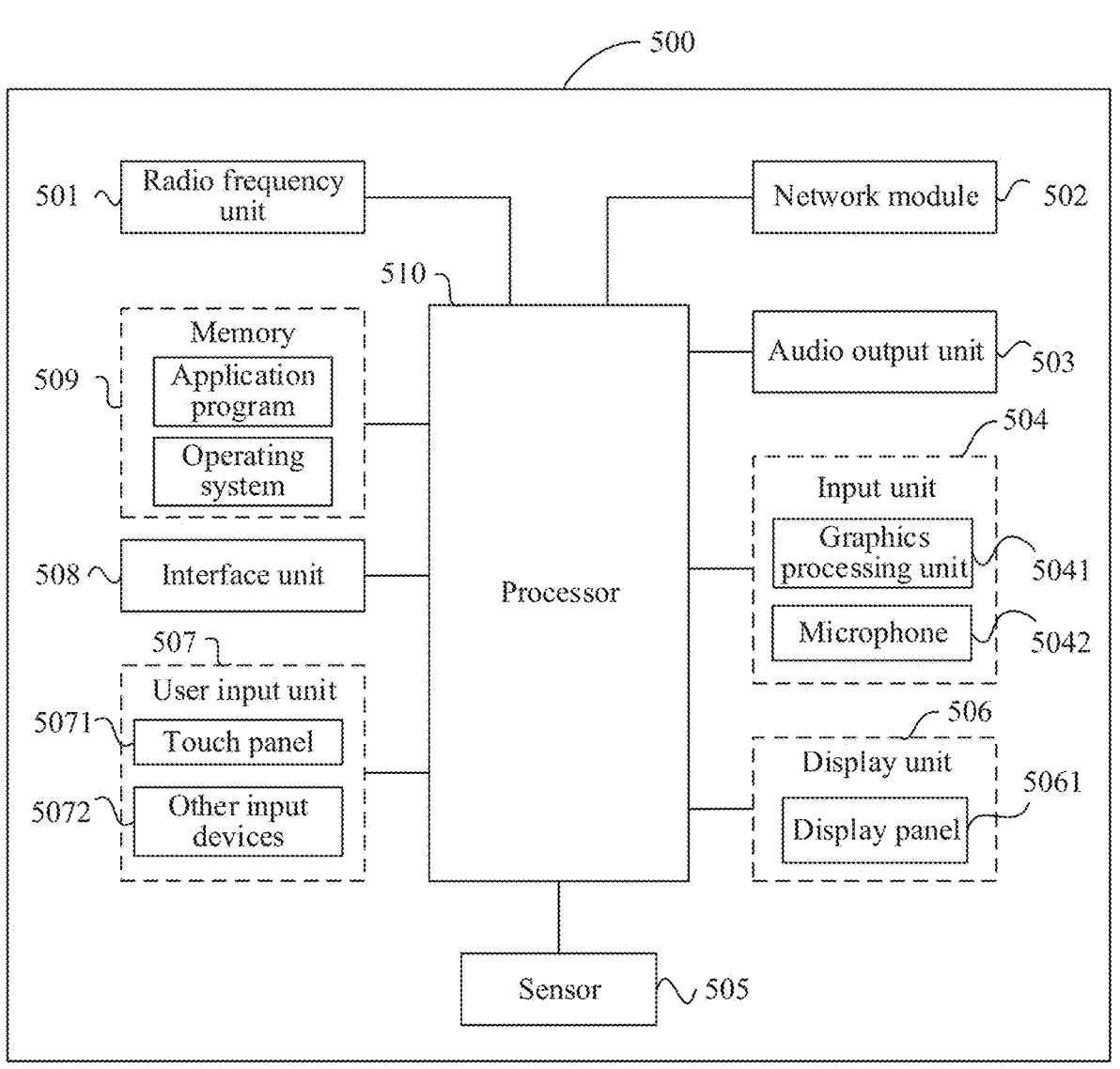
FIG. 5 is a schematic structural diagram of a terminal according to an embodiment of this application.

Specifically, for a case in which the coding end is a terminal, FIG. 5 is a schematic diagram of a hardware structure of a terminal implementing embodiments of this application.

The terminal 500 includes but is not limited to at least part of these components: a radio frequency unit 501, a network module 502, an audio output unit 503, an input unit 504, a sensor 505, a display unit 506, a user input unit 507, an interface unit 508, a memory 509, a processor 510, and the like.

It can be understood by those skilled in the art that the terminal 500 may further include a power supply (for example, battery) supplying power to the components. The power supply may be logically connected to the processor 510 via a power management system, so that functions such as charge management, discharge management, and power consumption management are implemented via the power management system. The structure of the terminal shown in FIG. 5 does not constitute any limitation on the terminal, and the terminal may include more or fewer components than shown in the figure, or combine some of the components, or have different arrangements of the components. Details are not described herein.

It should be understood that in an embodiment of this application, the input unit 504 may include a graphics processing unit (GPU) 5041 and a microphone 5042. The graphics processing unit 5041 processes image data of a static picture or video obtained by an image capture apparatus (such as a camera) in an image capture or video capture mode. The display unit 506 may include a display panel 5061. The display panel 5061 may be configured in a form of a liquid crystal display, an organic light-emitting diode display, or the like. The user input unit 507 includes at least one of a touch panel 5071 and other input devices 5072. The touch panel 5071 is also referred to as a touchscreen. The touch panel 5071 may include two parts: a touch detection apparatus and a touch controller. The other input devices 5072 may include but are not limited to a physical keyboard, a function button (for example, volume control button or on/off button), a trackball, a mouse, and a joystick. Details are not described herein.

In an embodiment of this application, the radio frequency unit 501 receives downlink data from a network-side device and transfers the data to the processor 510 for processing; and the radio frequency unit 501 can additionally send uplink data to the network-side device. Generally, the radio frequency unit 501 includes but is not limited to an antenna, an amplifier, a transceiver, a coupler, a low noise amplifier, a duplexer, and the like.

The memory 509 may be configured to store software programs or instructions and various data. The memory 509 may include a first storage area for storing programs or instructions and a second storage area for storing data. The first storage area may store an operating system, an application program or instructions required by at least one function (for example, a sound playback function or an image playback function), and the like. Additionally, the memory 509 may be a volatile memory or a non-volatile memory, or the memory 509 may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synch link DRAM, SLDRAM), and a direct rambus random access memory (Direct Rambus RAM, DRRAM). The memory 509 in this embodiment of this application includes but is not be limited to these and any other applicable types of memories.

The processor 510 may include one or more processing units. Optionally, the processor 510 may integrate an application processor and a modem processor. The application processor primarily processes operations involving an operating system, user interface, application program, or the like. The modem processor primarily processes radio communication signals, for example, being a baseband processor. It can be understood that the modem processor may be alternatively not integrated in the processor 510.

The processor 510 is configured for a coding end to perform coding through a differential space time block coding DSTBC scheme, a new space time block coding NSTBC codebook, and a power sum of transmit symbols on a transmit antenna in previous two symbol periods to obtain a transmit symbol for a current symbol period.

The processor 510 is configured for a coding end to determine a transmit symbol for a symbol period next to the current symbol period based on the transmit symbol for the current symbol period and the NSTBC codebook, where the previous two symbol periods are two adjacent symbol periods preceding the current symbol period.

In the embodiments of this application, a DSTBC scheme, an NSTBC codebook, and a power sum of transmit symbols on a transmit antenna in previous two symbol periods are used to calculate a transmit symbol for a current symbol period, and additionally, the NSTBC codebook with low complexity is used to calculate a transmit symbol for a next symbol period. Based on DSTBC design, neither a coding end nor a decoding end needs to know CSI, that is, no pilot signal needs to be transmitted on each transmit antenna, thereby reducing system overheads. In calculating the transmit symbol for the current symbol period, normalization is performed for the power sum of the transmit symbols on the transmit antenna in the previous two symbol periods, achieving applicability to nonconstant modulation. In addition, the NSTBC codebook can help to reduce the number of load impedance types on the antenna while ensuring diversity gain, reduce the complexity of system implementation, and effectively reduce the probability of detection errors.

Specifically, a codebook structure of the NSTBC codebook satisfies:

$$\begin{pmatrix} s_{2t+1} & s_{2t+2}^* \\ s_{2t+2} & -s_{2t+1}^* \end{pmatrix},$$

where $s_{2t+1}$ and $$s_{2t+2}^*$$

are transmit symbols on two transmit antennas obtained by the coding end from coding in the (2t+1)-th symbol period; and $s_{2t+2}$ and $$-s_{2t+1}^*$$

are transmit symbols on two transmit antennas obtained by the coding end from coding in the (2t+2)-th symbol period; where the symbol $$s_{2t+2}^*$$

is the conjugate of the symbol $s_{2t+2}$, and the symbol $$-s_{2t+1}^*$$

is the negative conjugate of the symbol $s_{2t+1}$; and the (2t+1)-th symbol period is the current symbol period, and the (2t+2)-th symbol period is a symbol period next to the current symbol period.

Specifically, the processor 510 is configured for the coding end to:

determine a coding coefficient vector for the current symbol period through a DSTBC scheme, an NSTBC codebook, and a power of a transmit symbol in a previous symbol period; and determine a transmit symbol for a symbol period next to the current symbol period based on the coding coefficient vector for the current symbol period.

Specifically, the processor 510 is configured for the coding end to:

based on the formula:

$$(s_{2t+1}, s_{2t+2}^*) = \frac{A(\mathcal{D}_{2t+1})(s_{2t-1}, s_{2t}^*) + B(\mathcal{D}_{2t+1})(s_{2t}, -s_{2t-1}^*)}{\left(|s_{2t-1}|^2 + |s_{2t}|^2\right)}$$

determine transmit symbols on two transmit antennas obtained by the coding end from coding in the (2t+1)-th symbol period; where $(A(\mathcal{D}_{2t+1}), B(\mathcal{D}_{2t+1}))$ is the coding coefficient vector for the (2t+1)-th symbol period determined by the coding end, $s_{2t-1}$ and $s^*_{2t}$ are transmit symbols on two transmit antennas obtained by the coding end from coding in the (2t−1)-th symbol period, $s_{2t}$ and $$-s_{2t-1}^*$$

are transmit symbols on two transmit antennas obtained by the coding end from coding in the 2t-th symbol period, and $|s_{2t-1}|^2 + |s_{2t}|^2$ is the power sum of the transmit symbols on two transmit antennas in the (2t−1)-th symbol period.

Specifically, the processor 510 is configured for the coding end to:

based on the formula:

$$A(\mathcal{D}_{2t+1}) = s_{2t+1}s_{2t-1}^* + s_{2t+2}^*s_{2t},$$

and $$B(\mathcal{D}_{2t+1}) = s_{2t+1}s_{2t}^* - s_{2t+2}^*s_{2t-1},$$

determine the coding coefficient vector $(A(\mathcal{D}_{2t+1}), B(\mathcal{D}_{2t+1}))$ of the coding end for the (2t+1)-th symbol period, where

37

$s_{2t+1}$ and $$s^*_{2t+2}$$

are transmit symbols on two transmit antennas obtained by the coding end from coding in the (2t+1)-th symbol period, $s_{2t-1}$ and $$s^*_{2t}$$

are transmit symbols on two transmit antennas obtained by the coding end from coding in the (2t−1)-th symbol period, and $s_{2t}$ and $$-s^*_{2t-1}$$

are transmit symbols on two transmit antennas obtained by the coding end from coding in the 2t-th symbol period.

Specifically, the processor 510 is configured for the coding end to:

determine a coding coefficient vector $(A(\mathcal{D}_{2t+1}), B(\mathcal{D}_{2t+1}))$ of the coding end for the (2t+1)-th symbol period based on a preset mapping table between original bits or original symbols and coding coefficient vectors, where the preset mapping table contains the mapping relationship between the original bits or symbols and $(A(\mathcal{D}_{2t+1}), B(\mathcal{D}_{2t+1}))$ after the determination of initial reference symbols.

Specifically, the processor 510 may be further configured for the coding end to:

based on the formula:

$$(s_{2t+1}, s^*_{2t+2}) = \frac{A(\mathcal{D}_{2t+1})(s_{2t-1}, s^*_{2t}) + B(\mathcal{D}_{2t+1})(s_{2t}, -s^*_{2t-1})}{\sqrt{|s_{2t-1}|^2 + |s_{2t}|^2}}$$

determine transmit symbols on two transmit antennas obtained by the coding end from coding in the (2t+1)-th symbol period; where $(A(\mathcal{D}_{2t+1}), B(\mathcal{D}_{2t+1}))$ is the coding coefficient vector for the (2t+1)-th symbol period determined by the coding end, $s_{2t-1}$ and $$s^*_{2t}$$

are transmit symbols on two transmit antennas obtained by the coding end from coding in the (2t−1)-th symbol period, $s_{2t}$ and $$-s^*_{2t-1}$$

are transmit symbols on two transmit antennas obtained by the coding end from coding in the 2t-th symbol period, and $\sqrt{|s_{2t-1}|^2 + |s_{2t}|^2}$ is a square root of the power sum of the transmit symbols on two transmit antennas in the (2t−1)-th symbol period.

Specifically, the processor 510 may be further configured for the coding end to:

based on the formula:

$$A(\mathcal{D}_{2t+1}) = \frac{s_{2t+1}s^*_{2t-1} + s^*_{2t+2}s_{2t}}{\sqrt{|s_{2t-1}|^2 + |s_{2t}|^2}},$$

and $$B(\mathcal{D}_{2t+1}) = \frac{s_{2t+1}s^*_{2t} - s^*_{2t+2}s_{2t-1}}{\sqrt{|s_{2t-1}|^2 + |s_{2t}|^2}},$$

determine the coding coefficient vector $(A(\mathcal{D}_{2t+1}), B(\mathcal{D}_{2t+1}))$ of the coding end for the (2t+1)-th symbol period, where $s_{2t+1}$ and $$s^*_{2t+2}$$

are transmit symbols on two transmit antennas obtained by the coding end from coding in the (2t+1)-th symbol period, $s_{2t-1}$ and $$s^*_{2t}$$

are transmit symbols on two transmit antennas obtained by the coding end from coding in the (2t−1)-th symbol period, and $s_{2t}$ and $$-s^*_{2t-1}$$

are transmit symbols on two transmit antennas obtained by the coding end from coding in the 2t-th symbol period.

Specifically, the processor 510 may be further configured for the coding end to:

determine a coding coefficient vector $(A(\mathcal{D}_{2t+1}), B(\mathcal{D}_{2t+1}))$ of the coding end for the (2t+1)-th symbol period based on a preset mapping table between original bits or original symbols and coding coefficient vectors, where the preset mapping table contains the mapping relationship between the original bits or symbols and $(A(\mathcal{D}_{2t+1}), B(\mathcal{D}_{2t+1}))$ after the determination of initial reference symbols.

Specifically, the processor 510 is specifically configured for the coding end to:

determine that transmit symbols on two transmit antennas obtained by the coding end from coding in a first symbol period are $$(s_1, s^*_2),$$

and that transmit symbols on two transmit antennas obtained by the coding end from coding in a second symbol period are

39

$(s_2, -s_1^*),$ where $(s_1, s_2^*)$ and $(s_2, -s_1^*)$ satisfy the following NSTBC codebook:

$$\begin{pmatrix} s_1 & s_2^* \\ s_2 & -s_1^* \end{pmatrix};$$

and $(s_1, s_2^*)$ are the initial reference symbols determined.

Specifically, a mapping relationship is present between the original bits for the current symbol period and an amplitude of the transmit symbol for the current symbol period.

Specifically, the NSTBC codebook is used for space-time block coding, or the NSTBC codebook is used for polarization-time block coding.

Specifically, the transmit symbols are constant modulation symbols or nonconstant modulation symbols.

The constant modulation at least includes BPSK modulation.

The nonconstant modulation at least includes APSK modulation.

Figure 6:
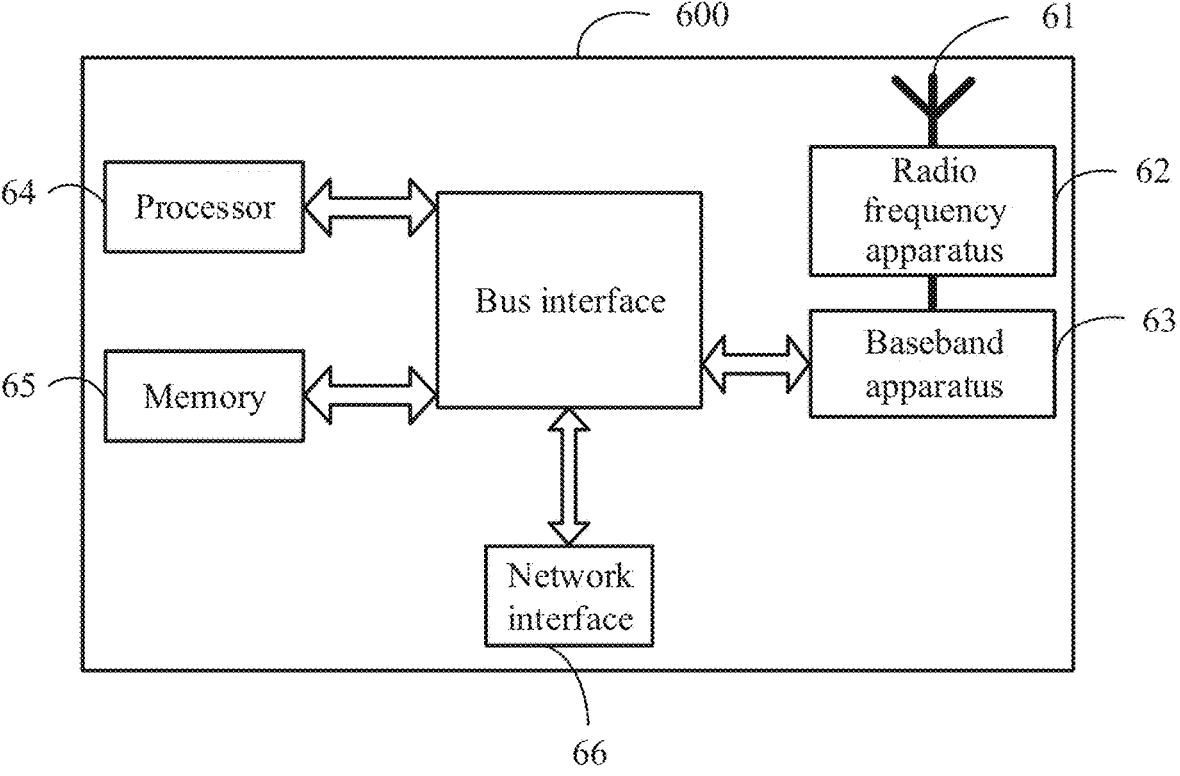
FIG. 6 is a schematic structural diagram of a network-side device according to an embodiment of this application.

Specifically, for a case in which the coding end is a network-side device, as shown in FIG. 6, the network-side device 600 includes an antenna 61, a radio frequency apparatus 62, a baseband apparatus 63, a processor 64, and a memory 65. The antenna 61 is connected to the radio frequency apparatus 62. In uplink, the radio frequency apparatus 62 receives information through the antenna 61, and sends the received information to the baseband apparatus 63 for processing. In downlink, the baseband apparatus 63 processes to-be-sent information, and sends the information to the radio frequency apparatus 62; and the radio frequency apparatus 62 processes the received information and then sends the information out through the antenna 61.

The method in the foregoing method embodiment may be implemented on the baseband apparatus 63. The baseband apparatus 63 includes a baseband processor.

The baseband apparatus 63 may include, for example, at least one baseband processing unit, where a plurality of chips are disposed on the baseband processing unit. As shown in FIG. 6, one of the chips is, for example, a baseband processor, and connected to the memory 65 through a bus interface, to invoke the program in the memory 65 to perform the operations of the network-side device shown in the foregoing method embodiment.

The network-side device may further include a network interface 66, where the interface is, for example, a common public radio interface (CPRI).

Specifically, the network-side device 600 in this embodiment of the present invention further includes: an instruction or program stored in the memory 65 and capable of running on the processor 64. The processor 64 invokes the instruction or program in the memory 65 to execute the method executed by the modules shown in FIG. 3, with the same technical effects achieved. To avoid repetition, details are not repeated herein.

An embodiment of this application further provides a readable storage medium. The readable storage medium has stored thereon a program or instructions, and when the program or instructions are executed by a processor, the processes of the foregoing embodiment of the coding method are implemented, with the same technical effects achieved. To avoid repetition, details are not repeated herein.

The processor is a processor in the terminal in the foregoing embodiment. The readable storage medium includes a computer-readable storage medium such as a computer read-only memory ROM, a random access memory RAM, a magnetic disk, or an optical disc.

Another embodiment of this application provides a chip. The chip includes a processor and a communication interface, the communication interface is coupled to the processor, and the processor is configured to run a program or instructions to implement the processes of the foregoing embodiment of the coding method, with the same technical effects achieved. To avoid repetition, details are not repeated herein.

It should be understood that the chip mentioned in this embodiment of this application may also be referred to as a system-level chip, a system chip, a chip system, a system-on-chip, or the like.

An embodiment of this application further provides a computer program product, where the computer program product is stored in a storage medium. When the computer program product is executed by at least one processor, the processes of the foregoing embodiment of the coding method are implemented, with the same technical effects achieved. To avoid repetition, details are not repeated herein.

An embodiment of this application further provides a communication device. The communication device is configured to implement the processes of the foregoing embodiment of the coding method, with the same technical effects achieved. To avoid repetition, details are not repeated herein.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

Based on the above description of embodiments, persons skilled in the art can clearly understand that the methods in the foregoing embodiments can be implemented through software on a necessary general hardware platform or certainly through hardware only, but in many cases, the former is the more preferred implementation. Based on such an understanding, the technical solutions of this application essentially, or the part contributing to the prior art may be implemented in a form of a computer software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A coding method, comprising:
    performing coding by a coding end through a differential space time block coding (DSTBC) scheme, a new space time block coding (NSTBC) codebook, and a power sum of transmit symbols on a transmit antenna in previous two symbol periods to obtain a transmit symbol for a current symbol period; and
    determining, by the coding end, a transmit symbol for a symbol period next to the current symbol period based on the transmit symbol for the current symbol period and the NSTBC codebook, wherein the previous two symbol periods are two adjacent symbol periods preceding the current symbol period.

2. The method according to claim 1, wherein a codebook structure of the NSTBC codebook satisfies:

$$\begin{pmatrix} s_{2t+1} & s_{2t+2}^* \\ s_{2t+2} & -s_{2t+1}^* \end{pmatrix},$$

wherein $s_{2t+1}$ and $s_{2t+2}^*$ are transmit symbols on two transmit antennas obtained by the coding end from coding in the (2t+1)-th symbol period; and $s_{2t+2}$ and $-s_{2t+1}^*$ are transmit symbols on two transmit antennas obtained by the coding end from coding in the (2t+2)-th symbol period; wherein the symbol $s_{2t+2}^*$ is the conjugate of the symbol $s_{2t+2}$, and the symbol $-s_{2t+1}^*$ is the negative conjugate of the symbol $s_{2t+1}$; and the (2t+1)-th symbol period is the current symbol period, and the (2t+2)-th symbol period is a symbol period next to the current symbol period.

3. The method according to claim 1, wherein the performing coding by a coding end through a DSTBC scheme, an NSTBC codebook, and a power of a transmit symbol in a previous symbol period to obtain a transmit symbol for a current symbol period comprises:
    determine a coding coefficient vector for the current symbol period through a DSTBC scheme, an NSTBC codebook, and a power of a transmit symbol in a previous symbol period; and
    determining, by the coding end, a coded transmit symbol for the current symbol period based on the coding coefficient vector for the current symbol period.

4. The method according to claim 3, wherein the determining, by the coding end, a coded transmit symbol for the current symbol period based on the coding coefficient vector for the current symbol period comprises:
    based on the formula:

$$(s_{2t+1}, s_{2t+2}^*) = \frac{A(\mathcal{D}_{2t+1})(s_{2t-1}, s_{2t}^*) + B(\mathcal{D}_{2t+1})(s_{2t}, -s_{2t-1}^*)}{\left(|s_{2t-1}|^2 + |s_{2t}|^2\right)}$$

determining, by the coding end, transmit symbols on two transmit antennas obtained by the coding end from coding in the (2t+1)-th symbol period; wherein
    $(A(\mathcal{D}_{2t+1}), B(\mathcal{D}_{2t+1}))$ is the coding coefficient vector for the (2t+1)-th symbol period determined by the coding end, $s_{2t-1}$ and $s_{2t}^*$ are transmit symbols on two transmit antennas obtained by the coding end from coding in the (2t−1)-th symbol period, $s_{2t}$ and $-s_{2t-1}^*$ are transmit symbols on two transmit antennas obtained by the coding end from coding in the 2t-th symbol period, and $|s_{2t-1}|^2 + |s_{2t}|^2$ is the power sum of the transmit symbols on two transmit antennas in the (2t−1)-th symbol period.

5. The method according to claim 4, wherein the coding end determining a coding coefficient vector for the current symbol period comprises:
    based on the formula:

$$A(\mathcal{D}_{2t+1}) = s_{2t+1}s_{2t-1}^* + s_{2t+2}^* s_{2t},$$

and $$B(\mathcal{D}_{2t+1}) = s_{2t+1}s_{2t}^* - s_{2t+2}^* s_{2t-1},$$

determine the coding coefficient vector $(A(\mathcal{D}_{2t+1}),$ $B(\mathcal{D}_{2t+1}))$ of the coding end for the (2t+1)-th symbol period, wherein $s_{2t+1}$ and $$s_{2t+2}^{*}$$

are transmit symbols on two transmit antennas obtained by the coding end from coding in the (2t+1)-th symbol period, $s_{2t-1}$ and $$s_{2t}^{*}$$

are transmit symbols on two transmit antennas obtained by the coding end from coding in the (2t−1)-th symbol period, and $s_{2t}$ and $$-s_{2t-1}^{*}$$

are transmit symbols on two transmit antennas obtained by the coding end from coding in the 2t-th symbol period.

6. The method according to claim 3, wherein the determining, by the coding end, a coded transmit symbol for the current symbol period based on the coding coefficient vector for the current symbol period comprises:

based on the formula:

$$(s_{2t+1}, s_{2t+2}^{*}) = \frac{A(\mathcal{D}_{2t+1})(s_{2t-1}, s_{2t}^{*}) + B(\mathcal{D}_{2t+1})(s_{2t}, -s_{2t-1}^{*})}{\sqrt{|s_{2t-1}|^2 + |s_{2t}|^2}}$$

determining, by the coding end, transmit symbols on two transmit antennas obtained by the coding end from coding in the (2t+1)-th symbol period; wherein $(A(\mathcal{D}_{2t+1}), B(\mathcal{D}_{2t+1}))$ is the coding coefficient vector for the (2t+1)-th symbol period determined by the coding end, $s_{2t-1}$ and $$s_{2t}^{*}$$

are transmit symbols on two transmit antennas obtained by the coding end from coding in the (2t−1)-th symbol period, $s_{2t}$ and $$-s_{2t-1}^{*}$$

are transmit symbols on two transmit antennas obtained by the coding end from coding in the 2t-th symbol period, and $|s_{2t-1}|^2 + |s_{2t}|^2$ is a square root of the power sum of the transmit symbols on two transmit antennas in the (2t−1)-th symbol period.

7. The method according to claim 6, wherein the coding end determining a coding coefficient vector for the current symbol period comprises:

based on the formula:

$$A(\mathcal{D}_{2t+1}) = \frac{s_{2t+1}s_{2t-1}^{*} + s_{2t+2}^{*}s_{2t}}{\sqrt{|s_{2t-1}|^2 + |s_{2t}|^2}},$$

and $$B(\mathcal{D}_{2t+1}) = \frac{s_{2t+1}s_{2t}^{*} - s_{2t+2}^{*}s_{2t-1}}{\sqrt{|s_{2t-1}|^2 + |s_{2t}|^2}},$$

determine the coding coefficient vector $(A(\mathcal{D}_{2t+1}),$ $B(\mathcal{D}_{2t+1}))$ of the coding end for the (2t+1)-th symbol period, wherein $s_{2t+1}$ and $$s_{2t+2}^{*}$$

are transmit symbols on two transmit antennas obtained by the coding end from coding in the (2t+1)-th symbol period, $s_{2t-1}$ and $$s_{2t}^{*}$$

are transmit symbols on two transmit antennas obtained by the coding end from coding in the (2t−1)-th symbol period, and $s_{2t}$ and $$-s_{2t-1}^{*}$$

are transmit symbols on two transmit antennas obtained by the coding end from coding in the 2t-th symbol period.

8. The method according to claim 1, wherein the performing coding by a coding end through a DSTBC scheme, an NSTBC codebook, and a power of a transmit symbol in a previous symbol period to obtain a transmit symbol for a current symbol period comprises:

determining, by the coding end, a coding coefficient vector of the coding end for the current symbol period based on a preset mapping table between original bits or original symbols and coding coefficient vectors, wherein the preset mapping table contains a mapping relationship between the original bits or original symbols and the coding coefficient vectors after the determination of initial reference symbols, wherein the mapping relationship table is obtained based on the DSTBC scheme, the NSTBC codebook, and the power of the transmit symbol in the previous symbol period; and determining, by the coding end, a coded transmit symbol for the current symbol period based on the coding coefficient vector for the current symbol period.

9. The method according to claim 1, wherein transmit symbols on two transmit antennas obtained by the coding end from coding in a first symbol period are $$(s_1, s_2^{*}),$$

and transmit symbols on two transmit antennas obtained by the coding end from coding in a second symbol period are

US 12,695,544 B2

45

$(s_2, -s_1^*)$, wherein $(s_1, s_2^*)$ and $(s_2, -s_1^*)$ satisfy the following NSTBC codebook:

$$\begin{pmatrix} s_1 & s_2^* \\ s_2 & -s_1^* \end{pmatrix};$$

and $(s_1, s_2^*)$ are the initial reference symbols determined.

10. The method according to claim 1, wherein a mapping relationship is present between the original bits for the current symbol period and amplitudes of the transmit symbol for the current symbol period.

11. The method according to claim 1, wherein the NSTBC codebook is used for space-time block coding, or the NSTBC codebook is used for polarization-time block coding.

12. The method according to claim 1, wherein the transmit symbols are constant modulation symbols or nonconstant modulation symbols;

the constant modulation at least comprises binary phase shift keying (BPSK) modulation; and the nonconstant modulation at least comprises amplitude phase shift keying (APSK) modulation.

13. A coding end comprising a processor and a memory, wherein the memory has stored thereon a program or instructions capable of running on the processor, wherein the program or instructions, when executed by the processor, cause the coding end to perform:

performing coding through a differential space time block coding (DSTBC) scheme, a new space time block coding (NSTBC) codebook, and a power sum of transmit symbols on a transmit antenna in previous two symbol periods to obtain a transmit symbol for a current symbol period; and determining a transmit symbol for a symbol period next to the current symbol period based on the transmit symbol for the current symbol period and the NSTBC codebook, wherein the previous two symbol periods are two adjacent symbol periods preceding the current symbol period.

14. The coding end according to claim 13, wherein a codebook structure of the NSTBC codebook satisfies:

$$\begin{pmatrix} s_{2t+1} & s_{2t+2}^* \\ s_{2t+2} & -s_{2t+1}^* \end{pmatrix},$$

$s_{2t+1}$ and $s_{2t+2}^*$

46 are transmit symbols on two transmit antennas obtained by the coding end from coding in the (2t+1)-th symbol period; and $s_{2t+2}$ and $-s_{2t+1}^*$ are transmit symbols on two transmit antennas obtained by the coding end from coding in the (2t+2)-th symbol period; wherein the symbol $s_{2t+2}^*$ is the conjugate of the symbol $s_{2t+2}$, and the symbol $-s_{2t+1}^*$ is the negative conjugate of the symbol $s_{2t+1}$; and the (2t+1)-th symbol period is the current symbol period, and the (2t+2)-th symbol period is a symbol period next to the current symbol period.

15. The coding end according to claim 13, wherein when performing coding through a DSTBC scheme, an NSTBC codebook, and a power of a transmit symbol in a previous symbol period to obtain a transmit symbol for a current symbol period, the program or instructions, when executed by the processor, cause the coding end to perform:

determine a coding coefficient vector for the current symbol period through a DSTBC scheme, an NSTBC codebook, and a power of a transmit symbol in a previous symbol period; and determining a coded transmit symbol for the current symbol period based on the coding coefficient vector for the current symbol period.

16. The coding end according to claim 15, wherein when determining a coded transmit symbol for the current symbol period based on the coding coefficient vector for the current symbol period, the program or instructions, when executed by the processor, cause the coding end to perform:

based on the formula:

$$(s_{2t+1}, s_{2t+2}^*) = \frac{A(\mathcal{D}_{2t+1})(s_{2t-1}, s_{2t}^*) + B(\mathcal{D}_{2t+1})(s_{2t}, -s_{2t-1}^*)}{\left(|s_{2t-1}|^2 + |s_{2t}|^2\right)}$$

determining transmit symbols on two transmit antennas obtained by the coding end from coding in the (2t+1)-th symbol period; wherein $(A \mathcal{D}_{2t+1})$, $B(\mathcal{D}_{2t+1}))$ is the coding coefficient vector for the (2t+1)-th symbol period determined by the coding end, $s_{2t-1}$ and $s_{2t}^*$ are transmit symbols on two transmit antennas obtained by the coding end from coding in the (2t−1)-th symbol period, $s_{2t}$ and $$-s_{2t-1}^*$$

are transmit symbols on two transmit antennas obtained by the coding end from coding in the 2t-th symbol period, and $|s_{2t-1}|^2+|s_{2t}|^2$ is the power sum of the transmit symbols on two transmit antennas in the (2t−1)-th symbol period.

17. The coding end according to claim 16, wherein when determining a coding coefficient vector for the current symbol period, the program or instructions, when executed by the processor, cause the coding end to perform:

based on the formula:

$$A(\mathcal{D}_{2t+1}) = s_{2t+1}s_{2t-1}^* + s_{2t+2}^*s_{2t},$$

and $$B(\mathcal{D}_{2t+1}) = s_{2t+1}s_{2t}^* - s_{2t+2}^*s_{2t-1},$$

determine the coding coefficient vector $(A(\mathcal{D}_{2t+1}), B(\mathcal{D}_{2t+1}))$ of the coding end for the (2t+1)-th symbol period, wherein $s_{2t+1}$ and $$s_{2t+2}^*$$

are transmit symbols on two transmit antennas obtained by the coding end from coding in the (2t+1)-th symbol period, $s_{2t-1}$ and $$s_{2t}^*$$

are transmit symbols on two transmit antennas obtained by the coding end from coding in the (2t−1)-th symbol period, and $s_{2t}$ and $$-s_{2t-1}^*$$

are transmit symbols on two transmit antennas obtained by the coding end from coding in the 2t-th symbol period.

18. The coding end according to claim 15, wherein when determining a coded transmit symbol for the current symbol period based on the coding coefficient vector for the current symbol period, the program or instructions, when executed by the processor, cause the coding end to perform:

based on the formula:

$$(s_{2t+1}, s_{2t+2}^*) = \frac{A(\mathcal{D}_{2t+1})(s_{2t-1}, s_{2t}^*) + B(\mathcal{D}_{2t+1})(s_{2t}, -s_{2t-1}^*)}{\sqrt{|s_{2t-1}|^2 + |s_{2t}|^2}}$$

determining transmit symbols on two transmit antennas obtained by the coding end from coding in the (2t+1)-th symbol period; wherein $(A(\mathcal{D}_{2t+1}), B(\mathcal{D}_{2t+1}))$ is the coding coefficient vector for the (2t+1)-th symbol period determined by the coding end, $s_{2t-1}$ and $$s_{2t}^*$$

are transmit symbols on two transmit antennas obtained by the coding end from coding in the (2t−1)-th symbol period, $s_{2t}$ and $$-s_{2t-1}^*$$

are transmit symbols on two transmit antennas obtained by the coding end from coding in the 2t-th symbol period, and $\sqrt{|s_{2t-1}|^2+|s_{2t}|^2}$ is a square root of the power sum of the transmit symbols on two transmit antennas in the (2t−1)-th symbol period.

19. The coding end according to claim 18, wherein when determining a coding coefficient vector for the current symbol period, the program or instructions, when executed by the processor, cause the coding end to perform:

based on the formula:

$$A(\mathcal{D}_{2t+1}) = \frac{s_{2t+1}s_{2t-1}^* + s_{2t+2}^*s_{2t}}{\sqrt{|s_{2t-1}|^2 + |s_{2t}|^2}},$$

and $$B(\mathcal{D}_{2t+1}) = \frac{s_{2t+1}s_{2t}^* - s_{2t+2}^*s_{2t-1}}{\sqrt{|s_{2t-1}|^2 + |s_{2t}|^2}},$$

determine the coding coefficient vector $(A(\mathcal{D}_{2t+1}), B(\mathcal{D}_{2t+1}))$ of the coding end for the (2t+1)-th symbol period, wherein $\mathcal{D}$ $s_{2t+1}$ and $$s_{2t+2}^*$$

are transmit symbols on two transmit antennas obtained by the coding end from coding in the (2t+1)-th symbol period, $s_{2t-1}$ and $$s_{2t}^*$$

are transmit symbols on two transmit antennas obtained by the coding end from coding in the (2t−1)-th symbol period, and $s_{2t}$ and $$-s_{2t-1}^*$$

are transmit symbols on two transmit antennas obtained by the coding end from coding in the 2t-th symbol period.

20. A non-transitory readable storage medium, wherein the non-transitory readable storage medium has stored thereon a program or instructions, wherein the program or instructions, when executed by a processor of a coding end, cause the processor of the coding end to perform:

performing coding through a differential space time block coding (DSTBC) scheme, a new space time block coding (NSTBC) codebook, and a power sum of transmit symbols on a transmit antenna in previous two symbol periods to obtain a transmit symbol for a current symbol period; and determining a transmit symbol for a symbol period next to the current symbol period based on the transmit symbol for the current symbol period and the NSTBC codebook, wherein the previous two symbol periods are two adjacent symbol periods preceding the current symbol period.

\* \* \* \* \*